United States Patent
Lee

(10) Patent No.: US 11,722,659 B2
(45) Date of Patent: *Aug. 8, 2023

(54) AFFINE MOTION PREDICTION-BASED IMAGE DECODING METHOD AND APPARATUS USING AFFINE MVP CANDIDATE LIST IN IMAGE CODING SYSTEM

(71) Applicant: LG ELECTRONICS INC., Seoul (KR)

(72) Inventor: Jaeho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,036

(22) Filed: Mar. 1, 2022

(65) Prior Publication Data

US 2022/0182613 A1 Jun. 9, 2022

Related U.S. Application Data

(63) Continuation of application No. 17/068,534, filed on Oct. 12, 2020, now Pat. No. 11,303,887, which is a
(Continued)

(51) Int. Cl.
*H04N 19/513* (2014.01)
*H04N 19/105* (2014.01)
(Continued)

(52) U.S. Cl.
CPC ......... *H04N 19/105* (2014.11); *H04N 19/129* (2014.11); *H04N 19/132* (2014.11); *H04N 19/137* (2014.11); *H04N 19/176* (2014.11)

(58) Field of Classification Search
CPC .. H04N 19/105; H04N 19/129; H04N 19/132; H04N 19/176; H04N 19/137
See application file for complete search history.

(56) References Cited

U.S. PATENT DOCUMENTS

2015/0181232 A1 6/2015 Takahashi
2017/0332095 A1* 11/2017 Zou .................. H04N 19/124
(Continued)

FOREIGN PATENT DOCUMENTS

CN 108432250 A 8/2018
EP 2876875 A1 5/2015
(Continued)

OTHER PUBLICATIONS

J. Lee et al., "CE4: Simplified affine MVP list construction (Test 4.1.4)", Joint Video Experts Team (JVET) of ITU-T SG 16 WP 3 and ISO/IEC JTC 1/SC 29/WG 11, Oct. 8-12, 2018, JVET-L0141.
(Continued)

*Primary Examiner* — Howard D Brown, Jr.
(74) *Attorney, Agent, or Firm* — Dentons US LLP

(57) ABSTRACT

A method by which a decoding apparatus performs image decoding, according to the present document, comprises the steps of: obtaining motion prediction information about a current block from a bitstream; generating an affine MVP candidate list for the current block; deriving CPMVPs for CPs of the current block on the basis of the affine MVP candidate list; deriving CPMVDs for the CPs of the current block on the basis of the motion prediction information; deriving CPMVs for the CPs of the current block on the basis of the CPMVPs and the CPMVDs; and deriving prediction samples for the current block on the basis of the CPMVs.

17 Claims, 26 Drawing Sheets

Related U.S. Application Data continuation of application No. 16/870,352, filed on May 8, 2020, now Pat. No. 10,841,576, which is a continuation of application No. PCT/KR2019/011733, filed on Sep. 10, 2019.

(60) Provisional application No. 62/729,407, filed on Sep. 10, 2018.

(51) Int. Cl.
*H04N 19/129* (2014.01)
*H04N 19/132* (2014.01)
*H04N 19/137* (2014.01)
*H04N 19/176* (2014.01)

(56) References Cited

U.S. PATENT DOCUMENTS

| | | | |
|---|---|---|---|
| 2018/0098063 A1* | 4/2018 | Chen | H04N 19/176 |
| 2018/0192069 A1 | 7/2018 | Chen et al. | |
| 2019/0110064 A1* | 4/2019 | Zhang | H04N 19/54 |

FOREIGN PATENT DOCUMENTS

| | | | |
|---|---|---|---|
| EP | 3681161 A1 | 7/2020 | |
| EP | 3694212 A1 | 8/2020 | |
| EP | 3694213 A1 | 8/2020 | |
| EP | 3711300 A1 | 9/2020 | |
| KR | 1020150034718 A | 4/2015 | |
| KR | 20180061025 A | 6/2018 | |
| RU | 2597521 C1 | 9/2016 | |
| RU | 2621621 C2 | 6/2017 | |
| WO | 2011019247 A2 | 2/2011 | |
| WO | 2017087751 A1 | 5/2017 | |
| WO | 2017156705 A1 | 9/2017 | |
| WO | 18/101685 A1 | 6/2018 | |
| WO | 2018128379 A1 | 7/2018 | |
| WO | 2019099540 A1 | 5/2019 | |

OTHER PUBLICATIONS

M. Zhou et al., "Non-CE4: A study on affine merge mode", Joint Video Experts Team (JVET) of ITU-T SG WP 3 and ISO/IEC JTC 1/SC 29/WG 11, Jul. 10-18, 2018, JVET-K0052-v2.

Y. Han et al., "CE4.1.3: Affine motion compensation prediction", Joint Video Exploration Team (JVET) of ITU-T SG 16 WP 3 and ISO/IEC JTC 1/SC 29/WG 11, Jul. 10-18, 2018, JVET-K0337.

U.S. Appl. No. 16/870,352, filed May 8, 2020.

JVET-K1024-v2.

Haitao Yang, "CE4 summary report: Inter prediction and motion vector coding", Joint Video Experts Team (JVET) of ITU-T SG 16 WP 3 and ISO/IEC JTC 1/SC 29/WG 11, 11th Meeting: Ljubljiana, SI, Jul. 10-18, 2018, Document: JVEI -K0024_r3, pp. 1-59.

* cited by examiner

FIG. 4
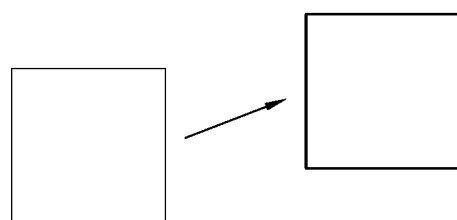
Translate
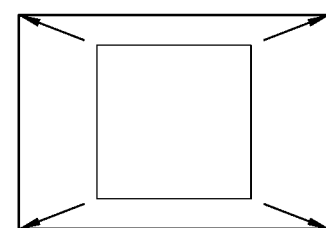
Scale
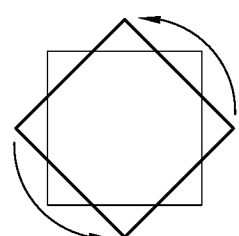
Rotate
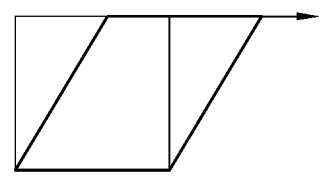
Shear

AFFINE MOTION PREDICTION-BASED IMAGE DECODING METHOD AND APPARATUS USING AFFINE MVP CANDIDATE LIST IN IMAGE CODING SYSTEM

CROSS-REFERENCE TO RELATED APPLICATIONS

This application is a Continuation of U.S. patent application Ser. No. 17/068,534, filed Oct. 12, 2020, which is a Continuation of U.S. patent application Ser. No. 16/870,352, filed on May 8, 2020, now allowed, which is a Continuation Bypass of International Application No. PCT/KR2019/011733, filed on Sep. 10, 2019, which claims the benefit of U.S. Provisional Application No. 62/729,407, filed on Sep. 10, 2018, all of which are hereby incorporated by reference in their entirety for all purposes as if fully set forth herein.

BACKGROUND OF THE DISCLOSURE

Field of the Disclosure

The present disclosure relates to a video coding technique and, more particularly, to a video decoding method and an apparatus based on affine motion prediction in a video coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

A technical object of the present disclosure is to provide a method and an apparatus for improving video coding efficiency.

Another technical object of the present disclosure is to provide a video decoding method and an apparatus which construct an affine MVP candidate list of a current block by deriving constructed affine MVP candidates based on neighboring blocks only when all the candidate motion vectors for CPs are available and perform prediction of the current block based on the constructed affine MVP candidate list.

Yet another technical object of the present disclosure is to provide a video decoding method and an apparatus which derive an affine MVP candidate by using a candidate motion vector derived from the process for deriving a constructed affine MVP candidate as an added affine MVP candidate when the number of available inherited affine MVP candidates and constructed affine MVP candidates, that is, the number of candidates of the MVP candidate list is less than the maximum number; and perform prediction of the current block based on the constructed affine MVP candidate list.

According to one embodiment of the present disclosure, a video decoding method performed by a decoding apparatus is provided. The method comprises obtaining motion prediction information for a current block from a bitstream; constructing an affine Motion Vector Predictor (MVP) candidate list for the current block; deriving Control Point Motion Vector Predictors (CPMVPs) for Control Points (CPs) of the current block based on the affine MVP candidate list; deriving Control Point Motion Vector Differences (CPMVDs) for the CPs of the current block based on the motion prediction information; deriving Control Point Motion Vectors (CPMVs) for the CPs of the current block based on the CPMVPs and the CPMVDs; deriving prediction samples for the current block based on the CPMVs; and generating a reconstructed picture for the current block based on the derived prediction samples, wherein the constructing the affine MVP candidate list comprises checking whether an inherited affined MVP candidate of the current block is available, wherein the inherited affine MVP candidate is derived when the inherited affine MVP candidate is available; checking whether a constructed affine MVP candidate of the current block is available, wherein the constructed affine MVP candidate is derived when the constructed affine MVP candidate is available, and the constructed affine MVP candidate includes a candidate motion vector for CP0 of the current block, a candidate motion vector for CP1 of the current block, and a candidate motion vector for CP2 of the current block; when the number of derived affine MVP candidates is less than 2 and the motion vector for CP0 is available, deriving a first affine MVP candidate, wherein the first affine MVP candidate is an affine MVP candidate including the motion vector for the CP0 as candidate motion vectors for the CPs; when the number of derived affine MVP candidates is less than 2 and the motion vector for CP1 is available, deriving a second affine MVP candidate, wherein the second affine MVP candidate is an affine MVP candidate including the motion vector for the CP1 as candidate motion vectors for the CPs; when the number of derived affine MVP candidates is less than 2 and the motion vector for CP2 is available, deriving a third affine MVP candidate, wherein the third affine MVP candidate is an affine MVP candidate including the motion vector for the CP2 as candidate motion vectors for the CPs; when the number of derived affine MVP candidates is less than 2, deriving a fourth affine MVP candidate including a temporal MVP derived based on a temporal neighboring block of the current block as candidate motion vectors for the CPs; and when the number of derived affine MVP candidates is less than 2, deriving a fifth affine MVP candidate including a zero motion vector as candidate motion vectors for the CPs.

According to another embodiment of the present disclosure, a decoding apparatus performing video coding is provided. The decoding apparatus comprises an entropy decoder obtaining motion prediction information for a current block; a predictor constructing an affine Motion Vector Predictor (MVP) candidate list for the current block, deriving Control Point Motion Vector Predictors (CPMVPs) for Control Points (CPs) of the current block based on the affine MVP candidate list, deriving Control Point Motion Vector Differences (CPMVDs) for the CPs of the current block based on the motion prediction information, deriving Control Point Motion Vectors (CPMVs) for the CPs of the current block based on the CPMVDs, deriving prediction samples for the current block based on the CPMVs; and an adder generating a reconstructed picture for the current block based on the derived prediction samples, wherein the affine MVP candidate list is constructed based on checking whether an inherited affined MVP candidate of the current block is available, wherein the inherited affine MVP candidate is derived when the inherited affine MVP candidate is available; checking whether a constructed affine MVP candidate of the current block is available, wherein the constructed affine MVP candidate is derived when the constructed affine MVP candidate is available, and the constructed affine MVP candidate includes a candidate motion vector for CP0 of the current block, a candidate motion vector for CP1 of the current block, and a candidate motion vector for CP2 of the current block; when the number of derived affine MVP candidates is less than 2 and the motion vector for CP0 is available, deriving a first affine MVP candidate, wherein the first affine MVP candidate is an affine MVP candidate including the motion vector for the CP0 as candidate motion vectors for the CPs; when the number of derived affine MVP candidates is less than 2 and the motion vector for CP1 is available, deriving a second affine MVP candidate, wherein the second affine MVP candidate is an affine MVP candidate including the motion vector for the CP1 as candidate motion vectors for the CPs; when the number of derived affine MVP candidates is less than 2 and the motion vector for CP2 is available, deriving a third affine MVP candidate, wherein the third affine MVP candidate is an affine MVP candidate including the motion vector for the CP2 as candidate motion vectors for the CPs; when the number of derived affine MVP candidates is less than 2, deriving a fourth affine MVP candidate including a temporal MVP derived based on a temporal neighboring block of the current block as candidate motion vectors for the CPs; and when the number of derived affine MVP candidates is less than 2, deriving a fifth affine MVP candidate including a zero motion vector as candidate motion vectors for the CPs.

According to yet another embodiment of the present disclosure, a video encoding method performed by an encoding apparatus is provided. The method comprises constructing an affine Motion Vector Predictor (MVP) candidate list for a current block; deriving Control Point Motion Vector Predictors (CPMVPs) for Control Points (CPs) of the current block based on the affine MVP candidate list; deriving CPMVs for the CPs of the current block; deriving Control Point Motion Vector Differences (CPMVDs) for the CPs of the current block based on the CPMVPs and the CPMVs; and encoding motion prediction information including information on the CPMVDs, wherein the constructing the affine MVP candidate list comprises checking whether an inherited affined MVP candidate of the current block is available, wherein the inherited affine MVP candidate is derived when the inherited affine MVP candidate is available; checking whether a constructed affine MVP candidate of the current block is available, wherein the constructed affine MVP candidate is derived when the constructed affine MVP candidate is available, and the constructed affine MVP candidate includes a candidate motion vector for CP0 of the current block, a candidate motion vector for CP1 of the current block, and a candidate motion vector for CP2 of the current block; when the number of derived affine MVP candidates is less than 2 and the motion vector for CP0 is available, deriving a first affine MVP candidate, wherein the first affine MVP candidate is an affine MVP candidate including the motion vector for the CP0 as candidate motion vectors for the CPs; when the number of derived affine MVP candidates is less than 2 and the motion vector for CP1 is available, deriving a second affine MVP candidate, wherein the second affine MVP candidate is an affine MVP candidate including the motion vector for the CP1 as candidate motion vectors for the CPs; when the number of derived affine MVP candidates is less than 2 and the motion vector for CP2 is available, deriving a third affine MVP candidate, wherein the third affine MVP candidate is an affine MVP candidate including the motion vector for the CP2 as candidate motion vectors for the CPs; when the number of derived affine MVP candidates is less than 2, deriving a fourth affine MVP candidate including a temporal MVP derived based on a temporal neighboring block of the current block as candidate motion vectors for the CPs; and when the number of derived affine MVP candidates is less than 2, deriving a fifth affine MVP candidate including a zero motion vector as candidate motion vectors for the CPs.

According to still another embodiment of the present disclosure, a video encoding apparatus is provided. The encoding apparatus comprises a predictor constructing an affine Motion Vector Predictor (MVP) candidate list for a current block, deriving Control Point Motion Vector Predictors (CPMVPs) for Control Points (CPs) of the current block, and deriving CPMVs for the CPs of the current block; a subtractor deriving Control Point Motion Vector Differences (CPMVDs) for the CPs of the current block based on the CPMVPs and the CPMVs; and an entropy encoder encoding motion prediction information including information on the CPMVDs, wherein the affine MVP candidate list is constructed based on checking whether an inherited affined MVP candidate of the current block is available, wherein the inherited affine MVP candidate is derived when the inherited affine MVP candidate is available; checking whether a constructed affine MVP candidate of the current block is available, wherein the constructed affine MVP candidate is derived when the constructed affine MVP candidate is available, and the constructed affine MVP candidate includes a candidate motion vector for CP0 of the current block, a candidate motion vector for CP1 of the current block, and a candidate motion vector for CP2 of the current block; when the number of derived affine MVP candidates is less than 2 and the motion vector for CP0 is available, deriving a first affine MVP candidate, wherein the first affine MVP candidate is an affine MVP candidate including the motion vector for the CP0 as candidate motion vectors for the CPs; when the number of derived affine MVP candidates is less than 2 and the motion vector for CP1 is available, deriving a second affine MVP candidate, wherein the second affine MVP candidate is an affine MVP candidate including the motion vector for the CP1 as candidate motion vectors for the CPs; when the number of derived affine MVP candidates is less than 2 and the motion vector for CP2 is available, deriving a third affine MVP candidate, wherein the third affine MVP candidate is an affine MVP candidate including the motion vector for the CP2 as candidate motion vectors for the CPs; when the number of derived affine MVP candidates is less than 2, deriving a fourth affine MVP candidate including a temporal MVP derived based on a temporal neighboring block of the current block as candidate motion vectors for the CPs; and when the number of derived affine MVP candidates is less than 2, deriving a fifth affine MVP candidate including a zero motion vector as candidate motion vectors for the CPs.

According to the present disclosure, the overall image/video compression efficiency may be improved.

According to the present disclosure, efficiency of video coding based on affine motion prediction may be improved.

According to the present disclosure, in deriving an affine MVP candidate list, only when all the candidate motion vectors for CPs of a constructed affine MVP candidate are available, the constructed affine MVP candidate may be added, through which complexity of deriving a constructed affine MVP candidate and constructing an affine MVP candidate list may be reduced and coding efficiency may be improved.

According to the present disclosure, in deriving an affine MVP candidate list, an additional affine MVP candidate may be derived based on a candidate motion vector for a CP derived from a process for deriving a constructed affine MVP candidate, through which complexity of constructing an affine MVP candidate list may be reduced and coding efficiency may be improved.

According to the present disclosure, in deriving an inherited affine MVP candidate, only when a top neighboring block is included in a current CTU, the inherited affine MVP candidate may be derived by using the top neighboring block, through which the amount of storage of a line buffer for affine prediction may be reduced and hardware cost may be minimized.

BRIEF DESCRIPTION OF THE DRAWINGS

FIG. 4 illustrates a motion expressed through an affine motion model.

DESCRIPTION OF EXEMPLARY EMBODIMENTS

Figure 1:
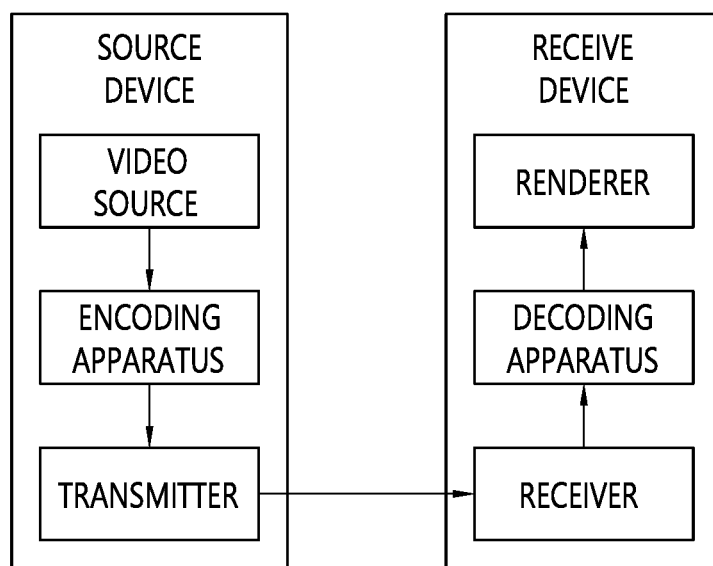
FIG. 1 illustrates an example of a video/image coding system to which the present disclosure may be applied.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 illustrates an example of a video/image coding system to which the present disclosure may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel and may represent only a pixel/pixel value of a luma component or only a pixel/pixel value of a chroma component.

A unit may represent a basic unit of image processing. The unit may include at least one of specific regions of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
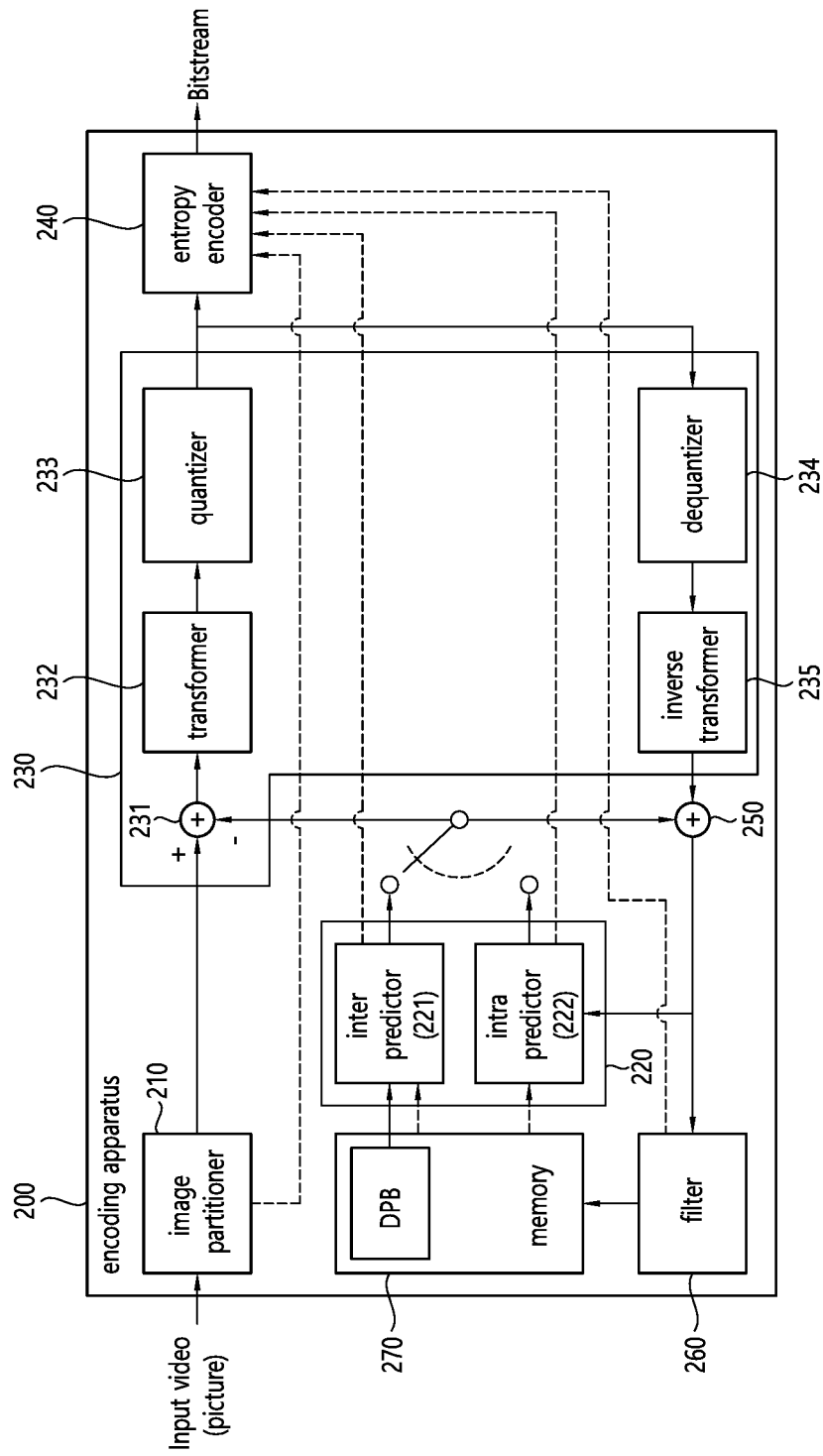
FIG. 2 is a schematic diagram illustrating a configuration of a video/image encoding apparatus to which the embodiment(s) of the present document may be applied.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first, and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage medium (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
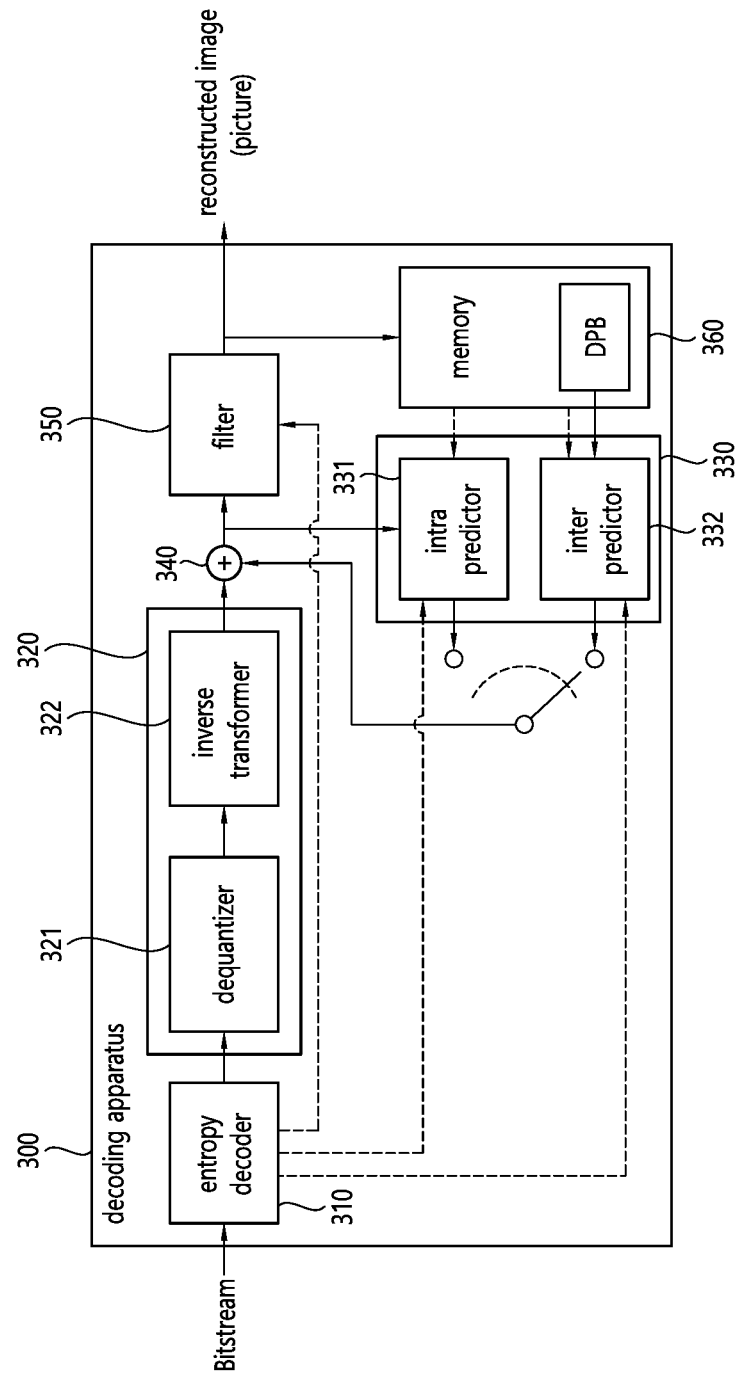
FIG. 3 is a schematic diagram illustrating a configuration of a video/image decoding apparatus to which the embodiment(s) of the present document may be applied.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 332 and an intra predictor 331. The residual processor 320 may include a dequantizer 321 and an inverse transformer 322. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the inter predictor 332 and the intra predictor 331.

Meanwhile, with respect to inter prediction, an inter prediction method which considers image distortion has been proposed. More specifically, affine motion model has been proposed, which efficiently derives motion vectors for sub-blocks or sample points of a current block and improves accuracy of inter prediction regardless of deformation due to image rotation, zoom-in, or zoom-out. In other words, affine motion model has been proposed, which derives motion vectors for sub-blocks or sample points of a current block. Prediction that employs the affine motion model may be referred to as affine inter prediction or affine motion prediction.

For example, the affine inter prediction using the affine motion model may efficiently express four motions, that is, four deformations, as described below.

FIG. 4 illustrates a motion expressed through the affine motion model. Referring to FIG. 4, a motion that may be represented through the affine motion model may include a translational motion, a scale motion, a rotational motion, and a shear motion. That is, a scale motion in which (a portion of) image is scaled according to the passage of time, a rotational motion in which (a portion of) image is rotated according to the passage of time, and a shear motion in which (a portion of) image is parallelogrammically deformed according to the passage of time, as well as the translational motion in which an (portion of) image is planarly moved according to the passage of time illustrated in FIG. 4, may be effectively represented as illustrated in FIG. 3.

The encoding apparatus/decoding apparatus may predict a distortion shape of the image based on the motion vectors at control points (CPs) of the current block through the affine inter prediction the compression performance of the image may be improved by increasing accuracy of prediction. In addition, since a motion vector for at least one control point of the current block may be derived using a motion vector of a neighboring block of the current block, a burden of a data amount on additional information may be reduced and inter prediction efficiency may be improved considerably.

As an example of the affine inter prediction, motion information at three control points, that is, three reference points, may be required.

Figure 5:
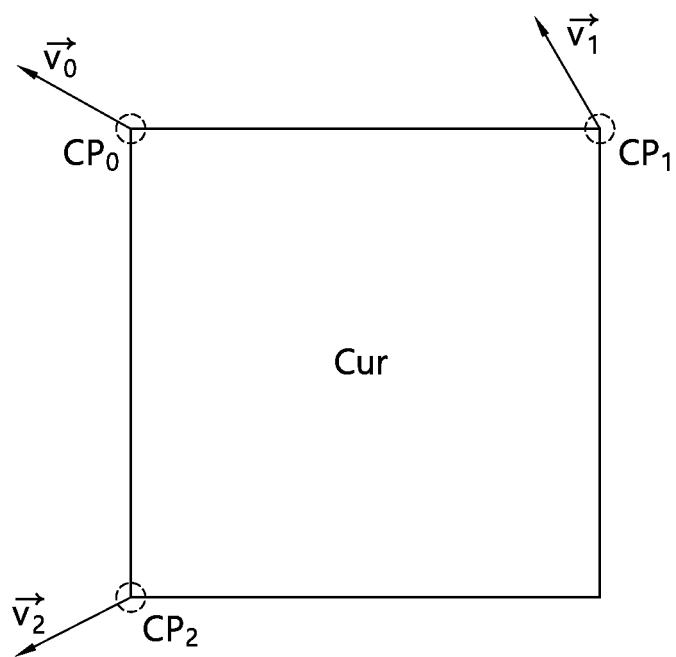
FIG. 5 illustrates the affine motion model in which motion vectors for 3 control points are used.

FIG. 5 illustrates the affine motion model in which motion vectors for three control points are used.

When a top-left sample position in a current block 500 is (0, 0), sample positions (0, 0), (w, 0), and (0, h) may be defined as the control points as shown in FIG. 5. Hereinafter, the control point of the sample position (0, 0) may be represented as CP0, the control point of the sample position (w, 0) may be represented as CP1, and the control point of the sample position (0, h) may be represented as CP2.

An equation for the affine motion model may be derived using the control points and the motion vectors of the corresponding control points described above. An equation for the affine motion model may be expressed as follows.

$$\begin{cases} v_x = \frac{(v_{1x} - v_{0x})}{w} * x + \frac{(v_{2x} - v_{0x})}{h} * y + v_{0x} \\ v_y = \frac{(v_{1y} - v_{0y})}{w} * x - \frac{(v_{2y} - v_{0y})}{h} * y + v_{0y} \end{cases} \quad \text{[Equation 1]}$$

Here, w denotes a width of the current block 500, h denotes a height of the current block 500, $v_{0x}$ and $v_{0y}$ denote an x component and y component of the motion vector of CP0, respectively, $v_{1x}$ and $v_{1y}$ denote an x component and a y component of the motion vector of CP1, respectively, and $v_{2x}$ and $v_{2y}$ denote an x component and a y component of the motion vector of CP2, respectively. In addition, x denotes an x component of a position of a target sample in the current block 500, y denotes a y component of the position of the target sample in the current block 500, $v_x$ denotes an x component of a motion vector of the target sample in the current block 500, and $v_y$ denotes a y component of the motion vector of the target sample in the current block 500.

Since the motion vector of CP0, the motion vector of CP1, and the motion vector of CP2 are known, a motion vector based on the sample position in the current block may be derived based on Equation 1. That is, according to the affine motion model, the motion vectors $v0(v_{0x}, v_{0y})$, $v1(v_{1x}, v_{1y})$, and $v2(v_{2x}, v_{2y})$ at the control points may be scaled based on a distance ratio between the coordinates (x, y) of the target sample and the three control points to derive the motion vectors of the target sample according to the position of the target sample. That is, according to the affine motion model, a motion vector of each sample in the current block may be derived based on the motion vectors of the control points. Meanwhile, a set of motion vectors of samples in the current block derived according to the affine motion model may be referred to as an affine motion vector field (MVF).

Meanwhile, six parameters for Equation 1 may be represented by a, b, c, d, e, and f as shown in Equation 1 below, and an equation for the affine motion model represented by the six parameters may be as follows.

$$a = \frac{(v_{1x} - v_{0x})}{w} \quad b = \frac{(v_{2x} - v_{0x})}{h} \quad c = v_{0x}$$
$$d = \frac{(v_{1y} - v_{0y})}{w} \quad e = -\frac{(v_{2y} - v_{0y})}{h} \quad f = v_{0y}$$
$$\begin{cases} v_x = a*x + b*y + c \\ v_y = d*x + e*y + f \end{cases} \quad [\text{Equation 2}]$$

Here, w denotes a width of the current block 500, h denotes a height of the current block 500, $v_{0x}$ and $v_{0y}$ denote the x component of the motion vector of CP0, y components, $v_{1x}$ and $v_{1y}$ represent an x component and a y component of the motion vector of CP1, respectively, and $v_{2x}$ and $v_{2y}$ represent the x component and the y component of the motion vector of CP2, respectively. In addition, x denotes the x component of the position of the target sample in the current block 500, y denotes the y component of the position of the target sample in the current block 500, $v_x$ denotes the x component of the motion vector of the target sample in the current block 500, $v_y$ denotes the y component of the motion vector of the target sample in the current block 500.

The affine motion model or the affine inter prediction using the six parameters may be referred to as a 6-parameter affine motion model or AF6.

In addition, as an example of the affine inter prediction, motion information at two control points, i.e., two reference points, may be required.

Figure 6:
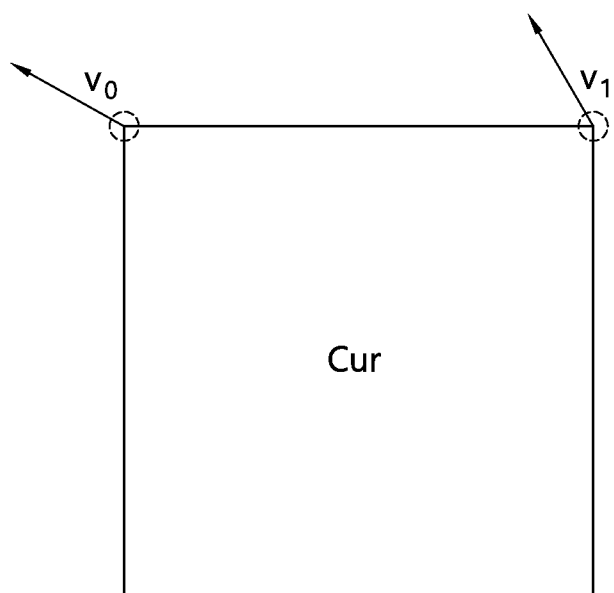
FIG. 6 illustrates an affine motion model in which motion vectors for 2 control points are used.

FIG. 6 illustrates the affine motion model in which motion vectors for two control points are used. The affine motion model using two control points may represent three motions including a translational motion, a scale motion, and a rotational motion. The affine motion model representing the three motions may be referred to as a similarity affine motion model or a simplified affine motion model.

When a top-left sample position in a current block 600 is (0, 0), sample positions (0, 0) and (w, 0) may be defined as the control points as shown in FIG. 6. Hereinafter, the control point of the sample position (0, 0) may be represented as CP0 and the control point of the sample position (w, 0) may be represented as CP1.

An equation for the affine motion model may be derived using the control points and the motion vectors of the corresponding control points described above. An equation for the affine motion model may be expressed as follows.

$$\begin{cases} v_x = \frac{(v_{1x} - v_{0x})}{w} * x - \frac{(v_{1y} - v_{0x})}{w} * y + v_{0x} \\ v_y = \frac{(v_{1y} - v_{0y})}{w} * x - \frac{(v_{1x} - v_{0x})}{w} * y + v_{0y} \end{cases} \quad [\text{Equation 3}]$$

Here, w denotes a width of the current block 600, $v_{0x}$ and $v_{0y}$ denote x and y components of the motion vector of CP0, respectively, and $v_{1x}$ and $v_{1y}$ denote x and y components of the motion vector of CP1. In addition, x denotes an x component of a position of a target sample in the current block 600, y denotes a y component of the position of the target sample in the current block 600, $v_x$ denotes an x component of the motion vector of the target sample in the current block 600, and $v_y$ denotes a y component of the motion vector of the target sample in the current block 600.

Meanwhile, four parameters of Equation 3 may be represented by a, b, c, and d as in the following Equation, and an equation for the affine motion model represented by the four parameters may be as follows.

$$a = \frac{(v_{1x} - v_{0x})}{w} \quad b = \frac{(v_{1y} - v_{0y})}{w} \quad c = v_{0x} \quad d = v_{0y}$$
$$\begin{cases} v_x = a*x - b*y + c \\ v_y = b*x + a*y + d \end{cases} \quad [\text{Equation 4}]$$

Here, w denotes a width of the current block 600, $v_{0x}$ and $v_{0y}$ denote x and y components of the motion vector of CP0, respectively, and $v_{1x}$ and $v_{1y}$ denote x and y components of the motion vector of CP1, respectively. In addition, x denotes an x component of a position of a target sample in the current block 600, y denotes a y component of the position of the target sample in the current block 600, $v_x$ denotes an x component of the motion vector of the target sample in the current block 600 and $v_y$ denotes a y component of the motion vector of the target sample in the current block 600. The affine motion model using the two control points may be represented by four parameters a, b, c, and d as shown in Equation 4, and thus, the affine motion model using the four parameters or the affine inter prediction may be referred to as a 4-parameter affine motion model or AF4. That is, according to the affine motion model, a motion vector of each sample in the current block may be derived based on the motion vectors of the control points. Meanwhile, a set of motion vectors of the samples in the current block derived according to the affine motion model may be referred to as an affine motion vector field (MVF).

Meanwhile, as described above, a motion vector of a sample unit may be derived through the affine motion model, and thus accuracy of inter prediction may be significantly improved. In this case, however, complexity in the motion compensation process may be significantly increased.

Accordingly, it may be limited such that a motion vector of a sub block unit of the current block, instead of deriving a motion vector of the sample unit, is derived.

Figure 7:
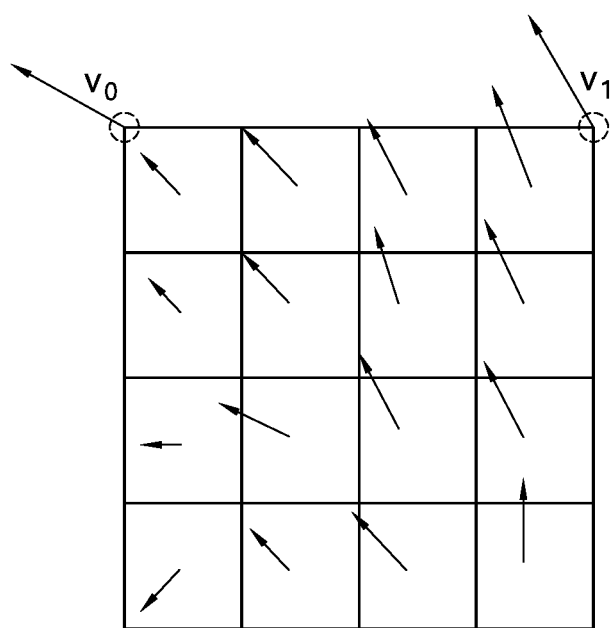
FIG. 7 illustrates a method of deriving a motion vector on a sub-block basis based on the affine motion model.

FIG. 7 illustrates a method of deriving a motion vector on a sub-block basis based on the affine motion model. FIG. 7 illustrates a case where a size of the current block is 16×16 and a motion vector is derived in units of 4×4 subblocks. The sub block may be set to various sizes. For example, when the sub block is set to n×n size (n is a positive integer, e.g., n is 4), a motion vector may be derived in units of n×n sub blocks in the current block based on the affine motion model and various methods for deriving a motion vector representing each subblock may be applied.

For example, referring to FIG. 7, a motion vector of each subblock may be derived using the center or bottom right side sample position of each subblock as a representative coordinate. Here, the center bottom right position may indicate a sample position positioned on the bottom right side among four samples positioned at the center of the sub block. For example, when n is an odd number, one sample may be positioned at the center of the sub block, and in this case, the center sample position may be used for deriving the motion vector of the sub block. However, when n is an even number, four samples may be positioned to be adjacent at the center of the subblock, and in this case, the bottom right sample position may be used to derive a motion vector. For example, referring to FIG. 7, representative coordinates of each subblock may be derived as (2, 2), (6, 2), (10, 2), . . . , (14, 14), and encoding apparatus/decoding apparatus may derive the motion vector of each subblock by substituting each of the representative coordinates of the subblocks into Equation 1 or 3 described above. The motion vectors of the subblocks in the current block derived through the affine motion model may be referred to as affine MVF.

Meanwhile, as an example, the size of the sub block in the current block may be derived based on the following equation.

$$\begin{cases} M = clip3\left(4, w, \frac{w*MvPre}{\max(abs(v_{1x} - v_{0x}), abs(v_{1y} - v_{0y}))}\right) \\ N = clip3\left(4, h, \frac{h*MvPre}{\max(abs(v_{2x} - v_{0x}), abs(v_{2y} - v_{0y}))}\right) \end{cases}$$ [Equation 5]

Here, M denotes a width of the sub block, and N denotes a height of the sub block. In addition, $v_{0x}$ and $v_{0y}$ denote an x component and a y component of CPMV0 of the current block, $v_{1x}$ and $v_{1y}$ denote an x component and a y component of CPMV1 of the current block, w denotes a width of the current block, h denotes a height of the current block, and MvPre denotes a motion vector fraction accuracy. For example, the motion vector fraction accuracy may be set to 1/16.

Meanwhile, in the inter prediction using the above-described affine motion model, that is, the affine motion prediction, may have an affine merge mode AF_MERGE and an affine inter mode AF_INTER. Here, the affine inter mode may be referred to as an affine MVP mode AF_MVP.

The affine merge mode is similar to an existing merge mode in that MVD for the motion vector of the control points is not transmitted. That is, similarly to the existing skip/merge mode, the affine merge mode may refer to an encoding/decoding method of performing prediction by deriving a CPMV for each of two or three control points from a neighboring block of the current block.

For example, when the AF_MRG mode is applied to the current block, motion vectors of CP0 and CP1 (namely, CPMV0 and CPMV1) may be derived from neighboring blocks to which affine mode has been applied among neighboring blocks of the current block. In other words, CPMV0 and CPMV1 of the neighboring blocks to which the affine mode has been applied may be derived as merge candidates or may be derived as CPMV0 and CPMV1 for the current block based on the merge candidates. Affine motion model may be derived based on CPMV0 and CPMV1 of neighboring blocks represented by the merge candidates, and based on the affine motion model, the CPMV0 and the CPMV1 for the current block may be derived.

The affine inter mode may represent inter prediction which derives Motion Vector Predictors (MVPs) for motion vectors of the control points, motion vectors of the control points based on received motion vector differences (MVDs) and the MVPs, and the affine MVF of the current block based on the motion vectors of the control points; and performs prediction based on the affine MVF. Here, the motion vector of the control point may be termed Control Point Motion Vector (CPMV), MVP of the control point may be termed Control Point Motion Vector Predictor (CPMVP), and MVD of the control point may be termed Control Point Motion Vector Difference (CPMVD). More specifically, for example, the encoding apparatus may derive Control Point Motion Vector Predictor (CPMVP) and Control Point Motion Vector (CPMV) for CP0 and CP1 (or CP0, CP1 and CP2), respectively and transmit or store information on the CPMVP and/or CPMVD which represents a difference between the CPMVP and the CPMV.

Here, if the affine inter mode is applied to the current block, the encoding/decoding apparatus may construct an affine MVP candidate list based on neighboring blocks of the current block, where the affine MVP candidate may be referred to as CPMVP pair candidate, and the affine MVP candidate list may be referred to as CPMVP candidate list.

Also, each affine MVP candidate may represent a combination of CPMVPs of CP0 and CP1 in the four-parameter affine motion model and a combination of CPMVPs of CP0, CP1, and CP2 in the six-parameter affine motion model.

Figure 8:
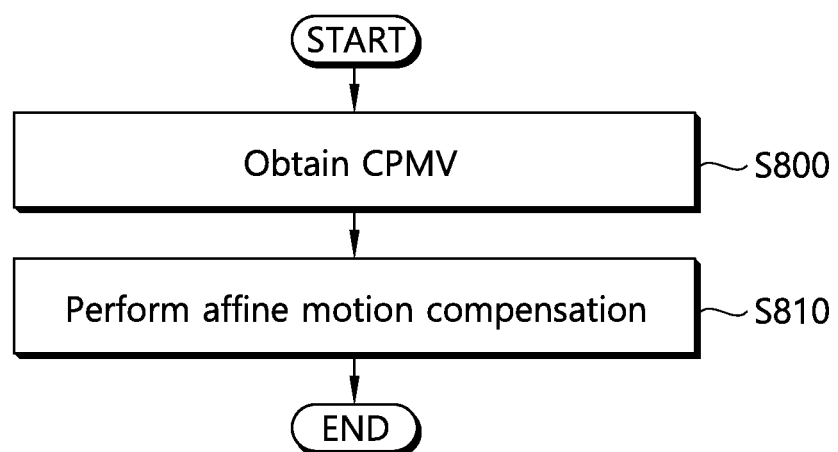
FIG. 8 is a flowchart illustrating an affine motion prediction method according to an embodiment of the present disclosure.

FIG. 8 is a flowchart illustrating an affine motion prediction method according to an embodiment of the present disclosure.

Referring to FIG. 8, the affine motion prediction method may be largely described as follows. Once the affine motion prediction method is started, a CPMV pair is first obtained S800. Here, if four-parameter affine model is used, the CPMV pair may include CPMV0 and CPMV1.

Afterwards, affine motion compensation may be performed based on the CPMV pair S810, after which affine motion prediction may be terminated.

Also, two affine prediction modes may be defined to determine the CPMV0 and the CPMV1. Here, the two affine prediction modes may include affine inter mode and affine merge mode. Affine inter mode may signal information on the Motion Vector Difference (MVD) between two motion vectors of CPMV0 and CPMV1 to determine the CPMV0 and the CPMV1 clearly. On the other hand, affine merge mode may derive a CPMV pair without signaling MVD information.

In other words, affine merge mode may derive CPMVs of a current block by using CPMVs of neighboring blocks coded in the affine mode, and if motion vectors are determined by the sub-block unit, affine merge mode may be referred to as sub-block merge mode.

In the affine merge mode, the encoding apparatus may signal, to the decoding apparatus, indexes of neighboring blocks coded in the affine mode for deriving CPMVs of the current block and may further signal the difference values among CPMVs of neighboring blocks and CPMVs of the current block. Here, the affine merge mode may construct an affine merge candidate list based on neighboring blocks, where indexes of the neighboring blocks may indicate the neighboring blocks to be utilized within the affine merge candidate list to derive the CPMVs of the current block. The affine merge candidate list may also be referred to as the sub-block merge candidate list.

The affine inter mode may also be referred to as the affine MVP mode. In the affine MVP mode, the CPMVs of a current block may be derived based on Control Point Motion Vector Predictor (CPMVP) and Control Point Motion Vector Difference (CPMVD). In other words, the encoding apparatus may determine CPMVPs for the CPMVs of a current block, derive the CPMVD, which is a difference value between the CPMV and the CPMVP of the current block, and signal information on the CPMVP and information on the CPMVD to the decoding apparatus. Here, the affine MVP mode may construct an affine MVP candidate list based on neighboring blocks, and information on the CPMVPs may indicate neighboring blocks to be utilized for deriving the CPMVPs for the CPMVs of the current block from the affine MVP candidate list. The affine MVP candidate list may also be referred to as the control point motion vector predictor candidate list.

For example, when affine inter mode of the six-parameter affine motion model is applied, the current block may be encoded as described below.

Figure 9:
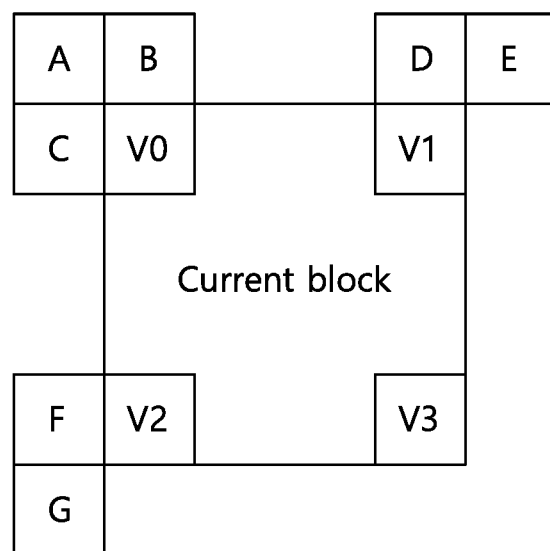
FIG. 9 illustrates a method for deriving a motion vector predictor at a control point according to one embodiment of the present disclosure.

FIG. 9 illustrates a method for deriving a motion vector predictor at a control point according to one embodiment of the present disclosure.

Referring to FIG. 9, the motion vector of CP0 of the current block may be denoted by $v_0$, motion vector of CP1 by $v_1$, motion vector of a control point at the bottom-left sample position by $v_2$, and motion vector of CP2 by $v_3$. In other words, the $v_0$ may represent the CPMVP of CP0, the $v_1$ the CPMVP of CP1, and the $v_2$ the CPMVP of CP2.

An affine MVP candidate may be a combination of the CPMVP candidate of the CP0, CPMVP candidate of the CP1, and CPMVP candidate of the CP2.

For example, the affine MVP candidate may be derived as follows.

More specifically, a maximum of 12 CPMVP candidate combinations may be determined as shown in the equation below.

$$\{(v_0, v_1, v_2) | v_0 = \{v_A, v_B, v_C\}, v_1 = \{v_D, v_E\}, v_2 = \{v_F, v_G\}\} \quad \text{[Equation 6]}$$

Here, $v_A$ represents the motion vector of neighboring block A, $v_B$ the motion vector of neighboring block B, $v_C$ the motion vector of neighboring block C, $v_D$ the motion vector of neighboring block D, $v_E$ the motion vector of neighboring block E, $v_F$ the motion vector of neighboring block F, and $v_G$ the motion vector of neighboring block G.

Additionally, the neighboring block A may represent a neighboring block positioned at the top-left of a top-left sample position of the current block, the neighboring block B may represent a neighboring block positioned at the top of the top-left sample position of the current block, and the neighboring block C may represent a neighboring block positioned at a left-side of the top-left sample position of the current block. Additionally, the neighboring block D may represent a neighboring block positioned at the top of a top-right sample position of the current block, and the neighboring block E may represent a neighboring block positioned at the top-right of the top-right sample position of the current block. And, the neighboring block F may represent a neighboring block positioned at a left-side of a bottom-left sample position of the current block, and the neighboring block G may represent a neighboring block positioned at the bottom-left of the bottom-left sample position of the current block.

In other words, referring to Eq. 6 above, the CPMVP candidate of CP0 may include the motion vector $v_A$ of the neighboring block A, motion vector $v_B$ of the neighboring block B and/or motion vector $v_C$ of the neighboring block C; the CPMVP candidate of CP1 may include the motion vector $v_D$ of the neighboring block D and/or motion vector $v_E$ of the neighboring block E; the CPMVP candidate of CP2 may include the motion vector $v_F$ of the neighboring block F and/or motion vector $v_G$ of the neighboring block G.

In other words, the CPMVP $v_0$ of CP0 may be derived based on at least one motion vector for the neighboring blocks A, B, and C with respect to the top-left sample position. Herein, neighboring block A may represent a block being positioned at a top-left of a top-left sample position of the current block, neighboring block B may represent a block being positioned at a top of the top-left sample position of the current block, and neighboring block C may represent a block being positioned at a left-side of the top-left sample position of the current block.

Based on the motion vectors of the neighboring blocks, a maximum of 12 CPMVP candidate combinations including the CPMVP candidate of the CP0, CPMVP candidate of the CP1, and CPMVP candidate of the CP2 may be derived.

Afterwards, derived CPMVP candidate combinations are arranged in the ascending order of DV, and two top CPMVP candidate combinations may be derived as the affine MVP candidates.

DV of a CPMVP candidate combination may be derived by the following equation.

$$DV = |(v_{1x} - v_{0x})*h - (v_{2y} - v_{0y})*w| + |(v_{1y} - v_{0y})*h + (v_{2x} - v_{0x})*w| \quad \text{[Equation 7]}$$

Afterwards, the encoding apparatus may determine CPMVs for the respective affine MVP candidates, compare the Rate Distortion (RD) cost among the CPMVs, and select the affine MVP candidate having the smallest RD cost as the optimal affine MVP candidate for the current block. The encoding apparatus may encode and signal the index and CPMVD indicating the optimal candidate.

Also, for example, if affine merge mode is applied, the current block may be encoded as described below.

Figure 10:
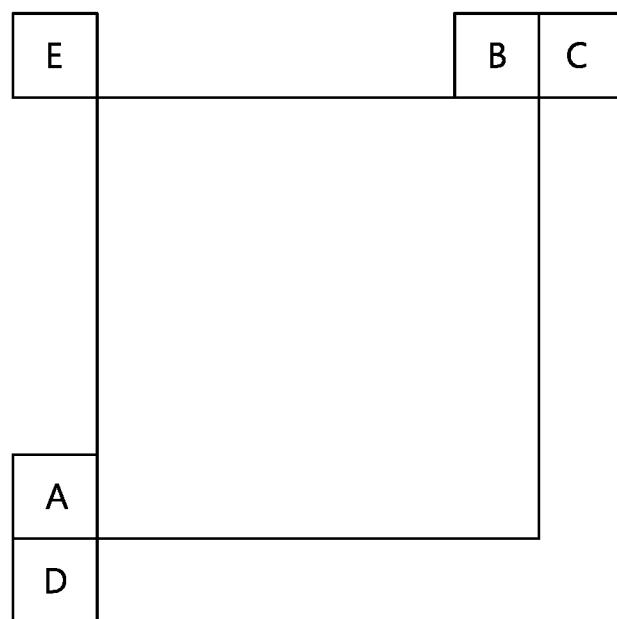
FIG. 10 illustrates a method for deriving a motion vector predictor at a control point according to one embodiment of the present disclosure.

FIG. 10 illustrates a method for deriving a motion vector predictor at a control point according to one embodiment of the present disclosure.

Based on neighboring blocks of a current block shown in FIG. 10, an affine merge candidate list of the current block may be constructed. The neighboring blocks may include neighboring block A, neighboring block B, neighboring block C, neighboring block D, and neighboring block E. The neighboring block A may represent a left neighboring block of the current block, the neighboring block B a top neighboring block of the current block, the neighboring block C a top-right corner neighboring block of the current block, the neighboring block D a bottom-left corner neighboring block of the current block, the neighboring block E a top-left corner neighboring block of the current block.

For example, when a size of the current block is W×H, x component of the top-left sample position of the current block is 0, and y component thereof is 0, the left neighboring block may be the block including a sample at the coordinates of (−1, H−1), the top neighboring block may be the block including a sample at the coordinates of (W−1, −1), the top-right corner neighboring block may be the block including a sample at the coordinates of (W, −1), the bottom-left corner neighboring block may be the block including a sample at the coordinates of (−1, H), and the top-left corner neighboring block may by the block including a sample at the coordinates of (−1, −1).

More specifically, for example, the encoding apparatus may scan the neighboring block A, neighboring block B, neighboring block C, neighboring block D, and neighboring block E of the current block in a specific scanning order; and determine the neighboring block first encoded in the affine prediction mode according to the scanning order as a candidate block of the affine merge mode, namely, affine merge candidate. In other words, the specific scanning order may be performed in the order of neighboring block A, neighboring block B, neighboring block C, neighboring block D, and neighboring block E.

Afterwards, the encoding apparatus may determine affine motion model of the current block by using CPMVs of the determined candidate block, determine CPMVs of the current block based on the affine motion model, and determine affine MVF of the current block based on the CPMVs.

As one example, if neighboring block A is determined as a candidate block of the current block, coding may be performed as described below.

Figure 11:
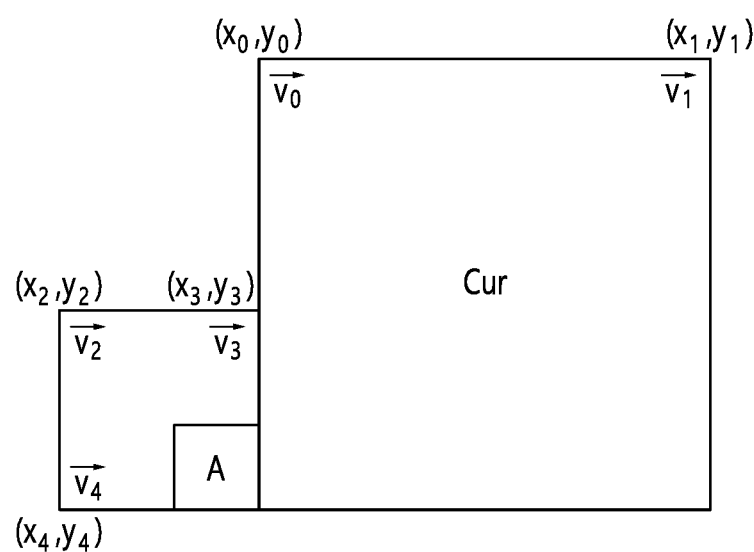
FIG. 11 illustrates one example of affine prediction performed when neighboring block A is selected as an affine merge candidate.

FIG. 11 illustrates one example of affine prediction performed when neighboring block A is selected as an affine merge candidate.

Referring to FIG. 11, the encoding apparatus may determine neighboring block A of the current block as a candidate block and derive affine motion model of the current block based on CPMVs of the neighboring block, $v_2$ and $v_3$. Afterwards, the encoding apparatus may determine CPMVs of the current block, $v_0$ and $v_1$, based on the affine motion model. The encoding apparatus may determine affine MVF based on the CPMVs of the current block, $v_0$ and $v_1$, and perform the process for encoding the current block based on the affine MVF.

Meanwhile, related to affine inter prediction, as a means to construct an affine MVP candidate list, inherited affine candidate and constructed affine candidate are being considered.

Here, the inherited affine candidate may be described as follows.

For example, if a neighboring block of the current block is an affine block, and a reference picture of the current block is the same as a reference picture of the neighboring block, an affine MVP pair of the current block may be determined from affine motion model of the neighboring block. Here, the affine block may represent a block to which the affine inter prediction has been applied. The inherited affine candidate may represent CPMVPs (for example, the affine MVP pair) derived based on affine motion model of the neighboring block.

More specifically, as one example, the inherited affine candidate may be derived as described below.

Figure 12:
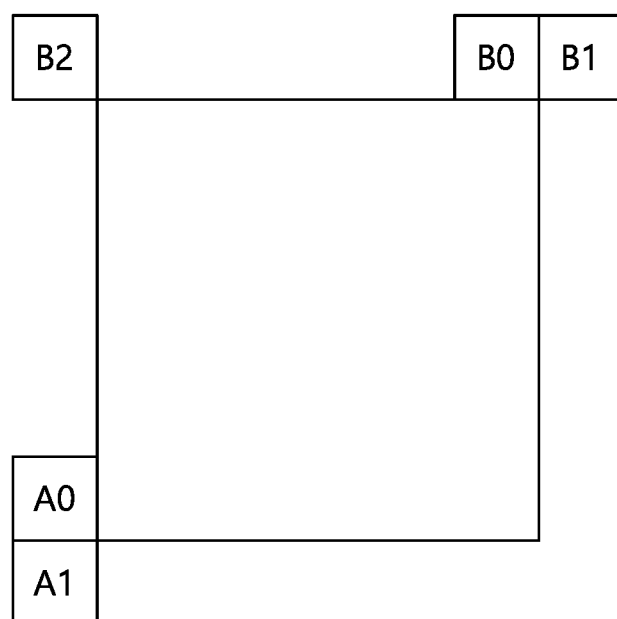
FIG. 12 illustrates neighboring blocks for deriving the inherited affine candidate.

FIG. 12 illustrates neighboring blocks for deriving the inherited affine candidate.

Referring to FIG. 12, neighboring blocks of the current block may include left neighboring block A0 of the current block, bottom-left corner neighboring block A1 of the current block, top neighboring block B0 of the current block, top-right corner neighboring block B1 of the current block, and top-left corner neighboring block B2 of the current block.

For example, when a size of the current block is W×H, x component of the top-left sample position of the current block is 0, and y component thereof is 0, the left neighboring block may be the block including a sample at the coordinates of (−1, H−1), the top neighboring block may be the block including a sample at the coordinates of (W−1, −1), the top-right corner neighboring block may be the block including a sample at the coordinates of (W, −1), the bottom-left corner neighboring block may be the block including a sample at the coordinates of (−1, H), and the top-left corner neighboring block may by the block including a sample at the coordinates of (−1, −1).

The encoding/decoding apparatus may check neighboring blocks A0, A1, B0, B1, and B2 sequentially, and if a neighboring block is coded according to affine motion model and a reference picture of the current block is the same as a reference picture of the neighboring block, two CPMVs or three CPMVs of the current block may be derived based on the affine motion model of the neighboring block. The CPMVs may be derived as an affine MVP candidate of the current block. The affine MVP candidate may represent the inherited affine candidate.

As one example, up to two inherited affine candidates may be derived based on the neighboring blocks.

For example, the encoding/decoding apparatus may derive a first affine MVP candidate of the current block based on a first block among neighboring blocks. Here, the first block may be coded according to affine motion model, and a reference picture of the first block may be the same as the reference picture of the current block. In other words, the first block may be a block first confirmed to satisfy a condition from checking of the neighboring blocks according to a specific order. The condition may be coded according to affine motion model, and the reference picture of the block may be the same as the reference picture of the current block.

Afterwards, the encoding/decoding apparatus may derive a second affine MVP candidate based on a second block among neighboring blocks. Here, the second block may be coded according to affine motion model, and a reference picture of the second block may be the same as the reference picture of the current block. In other words, the second block may be a block second confirmed to satisfy the condition from checking of the neighboring blocks according to a specific order. The condition may be coded according to affine motion model, and the reference picture of the block may be the same as the reference picture of the current block.

Meanwhile, for example, when the number of the inherited affine candidates available is less than 2 (namely, when the number of inherited affine candidates derived is less than 2), a constructed affine candidate may be considered. The constructed affine candidate may be derived as follows.

Figure 13:
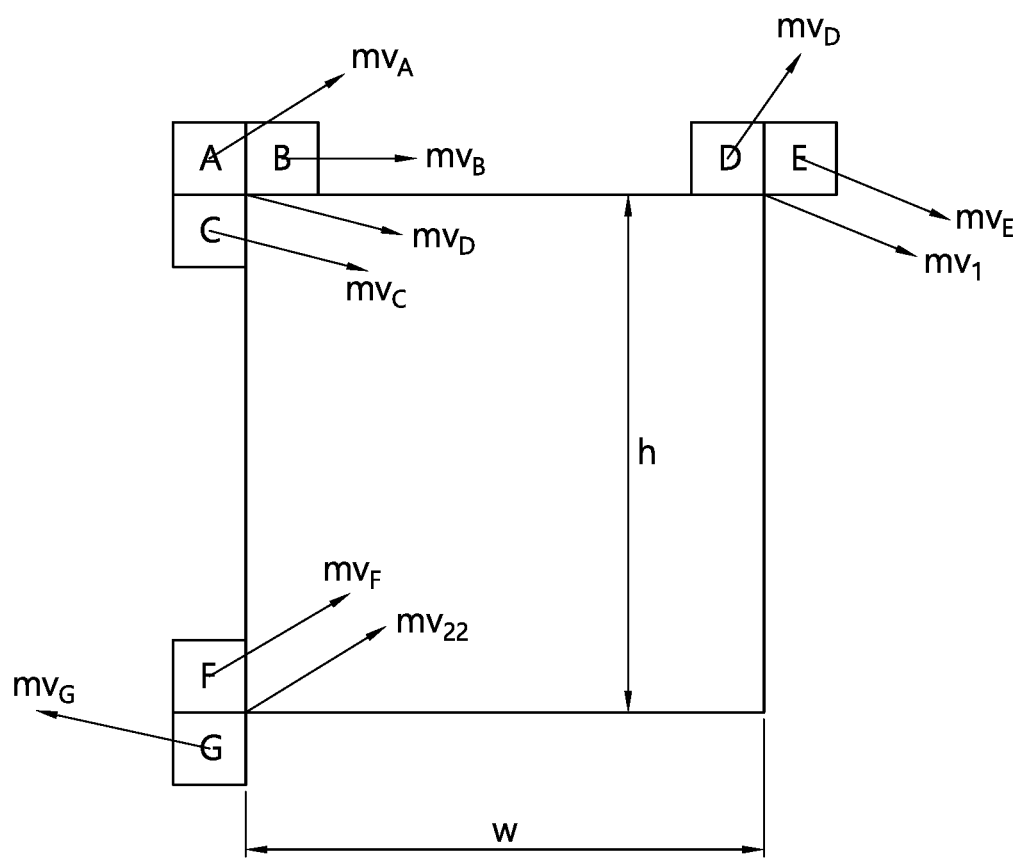
FIG. 13 illustrates spatial candidates for the constructed affine candidate.

FIG. 13 illustrates spatial candidates for the constructed affine candidate.

As shown in FIG. 13, motion vectors of neighboring blocks of the current block may be divided into three groups. Referring to FIG. 13, the neighboring blocks may include neighboring block A, neighboring block B, neighboring block C, neighboring block D, neighboring block E, neighboring block F, and neighboring block G.

The neighboring block A may represent a neighboring block located top left of a top-left sample position of the current block; the neighboring block B, a neighboring block located top of the top-left sample position of the current block; and the neighboring block C, a neighboring block located left of the top-left sample position of the current block. In addition, the neighboring block D may represent a neighboring block located top of a top-right sample position of the current block, and the neighboring block E may represent a neighboring block located top right of the top-right sample position of the current block. In addition, the neighboring block F may represent a neighboring block located left of a bottom-left sample position of the current block; and the neighboring block G may represent a neighboring block located bottom left of the bottom-left sample position of the current block.

For example, the three groups may include $S_0$, $S_1$, and $S_2$, where the $S_0$, $S_1$, and $S_2$ may be derived as shown in the table below.

TABLE 1

| $S_0 = \{mv_A, mv_B, mv_C\}$ | $S_1 = \{mv_D, mv_E\}$ | $S_2 = \{mv_F, mv_G\}$ |
|---|---|---|

Here, $mv_A$ represents the motion vector of the neighboring block A, $mv_B$ the motion vector of the neighboring block B, $mv_C$ the motion vector of the neighboring block C, $mv_D$ the motion vector of the neighboring block D, $mv_E$ the motion vector of the neighboring block E, $mv_F$ the motion vector of the neighboring block F, and $mv_G$ the motion vector of the neighboring block G. The $S_0$ may indicate a first group, $S_1$ may indicate a second group, and $S_2$ may indicate a third group.

The encoding/decoding apparatus may derive $mv_0$ from $S_0$, $mv_1$ from $S_1$, $mv_2$ from $S_2$, and an affine MVP candidate including $mv_0$, $mv_1$, and $mv_2$. The affine MVP candidate may indicate the constructed affine candidate. Also, $mv_0$ may be the CPMVP candidate of CP0, $mv_1$ may be the CPMVP candidate of CP1, and $mv_2$ may be the CPMVP candidate of CP2.

Here, the reference picture for $mv_0$ may be the same as the reference picture of the current block. In other words, $mv_0$ may be the motion vector first confirmed to satisfy a condition from checking of the motion vectors within $S_0$. The condition may be such that a reference picture for a motion vector is the same as the reference picture of the current block. The specific order may be such that motion vectors are checked within $S_0$ in the order of neighboring block A, neighboring block B, and neighboring block C. Also, the order of checking may be performed differently from that described above and may not be limited to the example above.

Also, the reference picture for $mv_1$ may be the same as the reference picture of the current block. In other words, $mv_1$ may be the motion vector first confirmed to satisfy a condition from checking of the motion vectors within $S_1$. The condition may be such that a reference picture for a motion vector is the same as the reference picture of the current block. The specific order may be such that motion vectors are checked within $S_1$ in the order of neighboring block D and neighboring block E. Also, the order of checking may be performed differently from that described above and may not be limited to the example above.

Also, the reference picture for $mv_2$ may be the same as the reference picture of the current block. In other words, $mv_2$ may be the motion vector first confirmed to satisfy a condition from checking of the motion vectors within $S_2$. The condition may be such that a reference picture for a motion vector is the same as the reference picture of the current block. The specific order may be such that motion vectors are checked within $S_2$ in the order of neighboring block F and neighboring block G. Also, the order of checking may be performed differently from that described above and may not be limited to the example above.

Meanwhile, when only $mv_0$ and $mv_1$ are available, namely, when only $mv_0$ and $mv_1$ are derived, $mv_2$ may be derived by the following equation.

$$\overline{mv}_2^x = \overline{mv}_0^x - h\frac{(\overline{mv}_1^y - \overline{mv}_0^y)}{w}, \overline{mv}_2^y = \overline{mv}_0^y + h\frac{(\overline{mv}_1^x - \overline{mv}_0^x)}{w} \quad \text{[Equation 8]}$$

Here, $\overline{mv}_2^x$ represents x component of $mv_2$, $\overline{mv}_2^y$ represents y component of $mv_2$, $\overline{mv}_0^x$ represents x component of $mv_0$, $\overline{mv}_0^y$ represents y component of $mv_0$, $\overline{mv}_1^x$ represents x component of $mv_1$, and $\overline{mv}_1^y$ represents y component of $mv_1$. Also, w represents width of the current block, and h represents height of the current block.

Meanwhile, when only $mv_0$ and $mv_2$ are derived, $mv_1$ may be derived by the following equation.

$$\overline{mv}_1^x = \overline{mv}_0^x + h\frac{(\overline{mv}_2^y - \overline{mv}_0^y)}{w}, \overline{mv}_1^y = \overline{mv}_0^y - h\frac{(\overline{mv}_2^x - \overline{mv}_0^x)}{w} \quad \text{[Equation 9]}$$

Here, $\overline{mv}_1^x$ represents x component of $mv_1$, $\overline{mv}_1^y$ represents y component of $mv_1$, $\overline{mv}_0^x$ represents x component of $mv_0$, $\overline{mv}_0^y$ represents y component of $mv_0$, $\overline{mv}_2^x$ represents x component of $mv_2$, and $\overline{mv}_2^y$ represents y component of $mv_2$. Also, w represents width of the current block, and h represents height of the current block.

Also, when the number of the inherited affined candidates available and/or the number of the constructed affined candidates is less than 2, the AMVP process of the existing HEVC standard may be applied for construction of the affine MVP list. In other words, when the number of the inherited affined candidates available and/or the number of the constructed affined candidates is less than 2, the process for constructing MVP candidates specified in the existing HEVC standard may be performed.

Meanwhile, flow diagrams of embodiments for constructing the affine MVP list may be described as follows.

Figure 14:
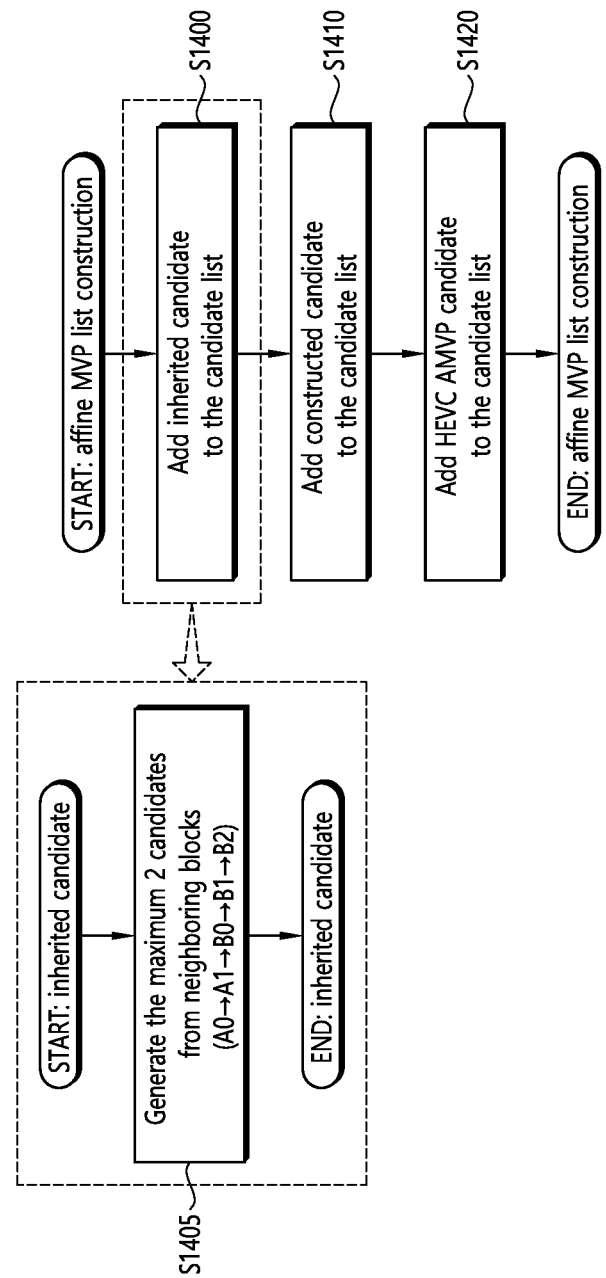
FIG. 14 illustrates one example of constructing an affine MVP list.

FIG. 14 illustrates one example of constructing an affine MVP list.

Referring to FIG. 14, the encoding/decoding apparatus may add an inherited candidate to the affine MVP list of a current block S1400. The inherited candidate may represent the inherited affine candidate described above.

More specifically, the encoding/decoding apparatus may derive up to two inherited affine candidates from neighboring blocks of the current block S1405. Here, the neighboring blocks may include left neighboring block A0 of the current block, bottom-left corner neighboring block A1 of the current block, top neighboring block B0 of the current block, top-right corner neighboring block B1 of the current block, and top-left corner neighboring block B2 of the current block.

For example, the encoding/decoding apparatus may derive a first affine MVP candidate of the current block based on a first block among the neighboring blocks. Here, the first block may be coded according to affine motion model, and the reference picture of the first block may be the same as the reference picture of the current block. In other words, the first block may be the block first confirmed to satisfy a condition from checking of the neighboring blocks according to a specific order. The condition may be coded according to affine motion model, and the reference picture of the block may be the same as the reference picture of the current block.

Afterwards, the encoding/decoding apparatus may derive a second affine MVP candidate based on a second block among neighboring blocks. Here, the second block may be coded according to affine motion model, and a reference picture of the second block may be the same as the reference picture of the current block. In other words, the second block may be the block satisfying a condition second confirmed from checking of the neighboring blocks according to a specific order. The condition may be coded according to affine motion model, and the reference picture of the block may be the same as the reference picture of the current block.

Meanwhile, the specific order may be such that the neighboring blocks are checked in the order of left neighboring block A0, bottom-left corner neighboring block A1, top neighboring block B0, top-right corner neighboring block B 1, and top-left corner neighboring block B2. Also, the order of checking may be performed differently from that described above and may not be limited to the example above.

The encoding/decoding apparatus may add a constructed candidate to the affine MVP list of the current block S1410. The constructed candidate may represent the constructed affine candidate above. The constructed candidate may also be termed a constructed affine MVP candidate. If the number of inherited candidates available is less than 2, the encoding/decoding apparatus may add the constructed candidate to the affine MVP list of the current block. For example, the encoding/decoding apparatus may derive one constructed affine candidate.

Meanwhile, the method for deriving a constructed affine candidate may be different depending on whether affine motion model applied to the current block is six-parameter affine motion model or four-parameter affine motion model. Detailed descriptions about how the constructed candidate is derived will be provided later.

The encoding/decoding apparatus may add an HEVC AMVP candidate to the affine MVP list of the current block S1420. If the number of inherited candidates available and/or the number of constructed candidates is less than 2, the encoding/decoding apparatus may add an HEVC AMVP candidate to the affine MVP list of the current block. In other words, when the number of inherited candidates available and/or the number of constructed candidates is less than 2, the encoding/decoding apparatus may perform the process for constructing an MVP candidate as specified in the existing HEVC standard.

Meanwhile, a method for deriving the constructed candidate may be performed as follows.

Figure 15:
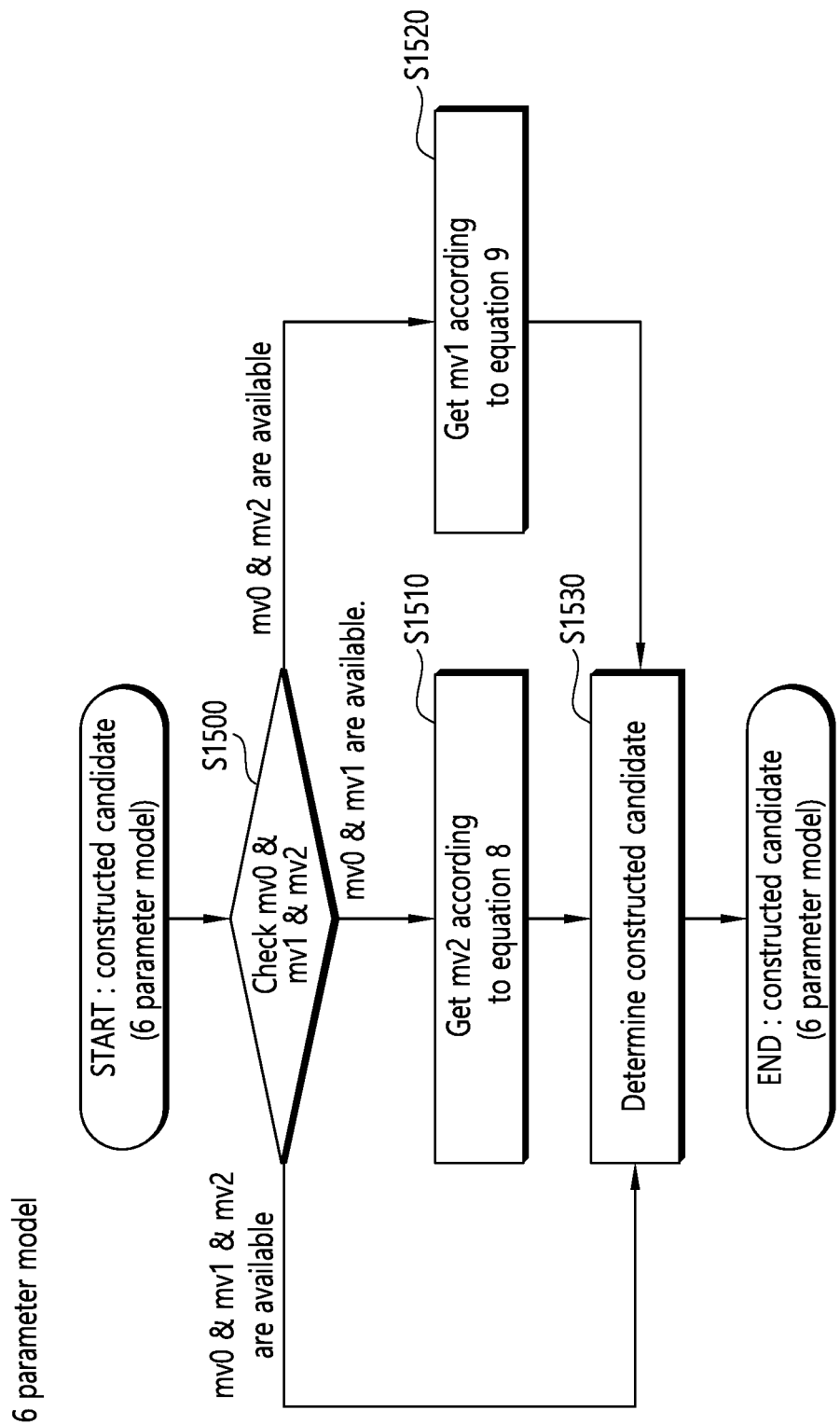
FIG. 15 illustrates one example of deriving the constructed candidate.

For example, if affine motion model applied to the current block is six-parameter affine motion model, the constructed candidate may be derived as illustrated in the embodiment of FIG. 15.

FIG. 15 illustrates one example of deriving the constructed candidate.

Referring to FIG. 15, the encoding/decoding apparatus may check $mv_0$, $mv_1$, and $mv_2$ for the current block S1500. In other words, the encoding/decoding apparatus may determine whether $mv_0$, $mv_1$, and $mv_2$ are available among neighboring blocks of the current block. Here, $mv_0$ may represent CPMVP candidate of CP0 of the current block, $mv_1$ may represent CPMVP candidate of CP1 of the current block, and $mv_2$ may represent CPMVP candidate of CP2 of the current block. Also, $mv_0$, $mv_1$, and $mv_2$ may represent candidate motion vectors for the respective CPs.

For example, the encoding/decoding apparatus may check whether motion vectors of neighboring blocks within a first group satisfy a specific condition according to a specific order. The encoding/decoding apparatus may derive the motion vector of a neighboring block first confirmed to satisfy the condition during the checking process as $mv_0$. In other words, $mv_0$ may be the motion vector first confirmed to satisfy the specific condition from checking of motion vectors within the first group according to a specific order. If motion vectors of the neighboring blocks within the first group do not satisfy the specific condition, available $mv_0$ may not exist. Here, for example, the specific order may be performed in order of neighboring block A within the first group, neighboring block B, and neighboring block C. Also, for example, the specific condition may be such that the reference picture for a motion vector of a neighboring block is the same as the reference picture of the current block.

Also, for example, the encoding/decoding apparatus may check whether motion vectors of neighboring blocks within a second group satisfy a specific condition according to a specific order. The encoding/decoding apparatus may derive the motion vector of a neighboring block first confirmed to satisfy the condition during the checking process as $mv_1$. In other words, $mv_1$ may be the motion vector first confirmed to satisfy the specific condition from checking of motion vectors within the second group according to a specific order. If motion vectors of the neighboring blocks within the second group do not satisfy the specific condition, available $mv_1$ may not exist. Here, for example, the specific order may be performed from neighboring block D within the second group to neighboring block E. Also, for example, the specific condition may be such that the reference picture for a motion vector of a neighboring block is the same as the reference picture of the current block.

Also, for example, the encoding/decoding apparatus may check whether motion vectors of neighboring blocks within a third group satisfy a specific condition according to a specific order. The encoding/decoding apparatus may derive the motion vector of a neighboring block first confirmed to satisfy the condition during the checking process as $mv_2$ In other words, $mv_2$ may be the motion vector first confirmed to satisfy the specific condition from checking of motion vectors within the third group according to a specific order. If motion vectors of the neighboring blocks within the third group do not satisfy the specific condition, available $mv_2$ may not exist. Here, for example, the specific order may be performed from neighboring block F within the third group to neighboring block G. Also, for example, the specific condition may be such that the reference picture for a motion vector of a neighboring block is the same as the reference picture of the current block.

Meanwhile, the first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

When only $mv_0$ and $mv_1$ are available for the current block, namely, when only $mv_0$ and $mv_1$ for the current block are derived, the encoding/decoding apparatus may derive $mv_2$ for the current block based on Eq. 8 above S1510. The encoding/decoding apparatus may derive $mv_2$ by inserting the derived $mv_0$ and $mv_1$ into Eq. 8 above.

When only $mv_0$ and $mv_2$ are available for the current block, namely, when only $mv_0$ and $mv_2$ for the current block are derived, the encoding/decoding apparatus may derive $mv_1$ for the current block based on Eq. 9 above S1520. The encoding/decoding apparatus may derive $mv_1$ by inserting the derived $mv_0$ and $mv_2$ into Eq. 9 above.

The encoding/decoding apparatus may provide the derived $mv_0$, $mv_1$ and $mv_2$ as constructed candidates of the current block S1530. When $mv_0$, $mv_1$ and $mv_2$ are available, namely, when $mv_0$, $mv_1$ and $mv_2$ are derived based on neighboring blocks of the current block, the encoding/decoding apparatus may provide the derived $mv_0$, $mv_1$ and $mv_2$ as constructed candidates of the current block.

Also, when only $mv_0$ and $mv_1$ are available for the current block, namely, when only $mv_0$ and $mv_1$ for the current block are derived, the encoding/decoding apparatus may provide the derived $mv_0$, $mv_1$, and $mv_2$ derived based on Eq. 8 above as the constructed candidates of the current block.

Also, when only $mv_0$ and $mv_2$ are available for the current block, namely, when only $mv_0$ and $mv_2$ for the current block are derived, the encoding/decoding apparatus may provide the derived $mv_0$, $mv_2$, and $mv_1$ derived based on Eq. 9 above as the constructed candidates of the current block.

Also, for example, if affine motion model applied to the current block is four-parameter affine motion model, the constructed candidate may be derived as illustrated in the embodiment of FIG. 15.

Figure 16:
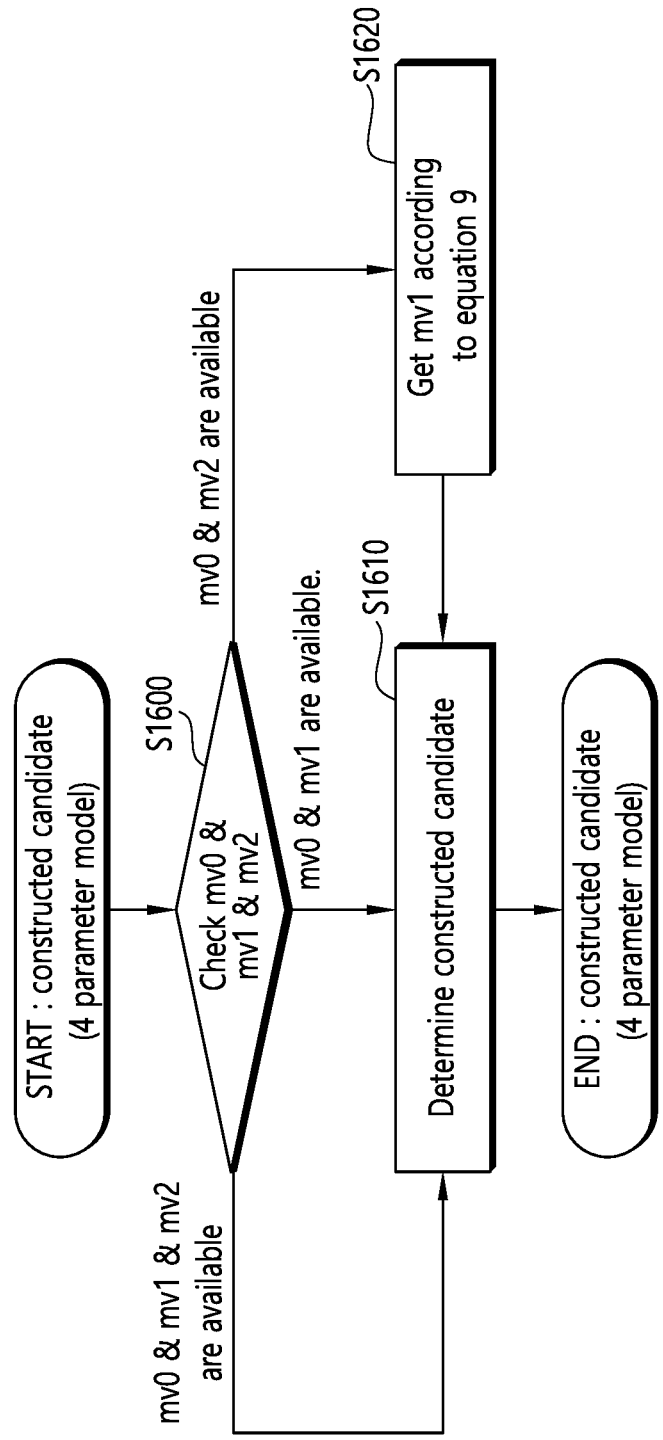
FIG. 16 illustrates one example of deriving the constructed candidate.

FIG. 16 illustrates one example of deriving the constructed candidate.

Referring to FIG. 16, the encoding/decoding apparatus may check $mv_0$, $mv_1$, and $mv_2$ S1600. In other words, the encoding/decoding apparatus may determine whether $mv_0$, $mv_1$, and $mv_2$ are available among neighboring blocks of the current block. Here, $mv_0$ may represent CPMVP candidate of $CP_0$ of the current block, $mv_1$ may represent CPMVP candidate of $CP_1$ of the current block, and $mv_2$ may represent CPMVP candidate of $CP_2$ of the current block.

For example, the encoding/decoding apparatus may check whether motion vectors of neighboring blocks within a first group satisfy a specific condition according to a specific order. The encoding/decoding apparatus may derive the motion vector of a neighboring block first confirmed to satisfy the condition during the checking process as $mv_0$. In other words, $mv_0$ may be the motion vector first confirmed to satisfy the specific condition from checking of motion vectors within the first group according to a specific order. If motion vectors of the neighboring blocks within the first group do not satisfy the specific condition, available $mv_0$ may not exist. Here, for example, the specific order may be performed in order of neighboring block A within the first group, neighboring block B, and neighboring block C. Also, for example, the specific condition may be such that the reference picture for a motion vector of a neighboring block is the same as the reference picture of the current block.

Also, for example, the encoding/decoding apparatus may check whether motion vectors of neighboring blocks within a second group satisfy a specific condition according to a specific order. The encoding/decoding apparatus may derive the motion vector of a neighboring block first confirmed to satisfy the condition during the checking process as $mv_1$. In other words, $mv_1$ may be the motion vector first confirmed to satisfy the specific condition from checking of motion vectors within the second group according to a specific order. If motion vectors of the neighboring blocks within the second group do not satisfy the specific condition, available $mv_1$ may not exist. Here, for example, the specific order may be performed from neighboring block D within the second group to neighboring block E. Also, for example, the specific condition may be such that the reference picture for a motion vector of a neighboring block is the same as the reference picture of the current block.

Also, for example, the encoding/decoding apparatus may check whether motion vectors of neighboring blocks within a third group satisfy a specific condition according to a specific order. The encoding/decoding apparatus may derive the motion vector of a neighboring block first confirmed to satisfy the condition during the checking process as $mv_2$ In other words, $mv_2$ may be the motion vector first confirmed to satisfy the specific condition from checking of motion vectors within the third group according to a specific order. If motion vectors of the neighboring blocks within the third group do not satisfy the specific condition, available $mv_2$ may not exist. Here, for example, the specific order may be performed from neighboring block F within the third group to neighboring block G. Also, for example, the specific condition may be such that the reference picture for a motion vector of a neighboring block is the same as the reference picture of the current block.

Meanwhile, the first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

When only $mv_0$ and $mv_1$ are available for the current block or when $mv_0$, $mv_1$, and $mv_2$ are available for the current block, namely, when only $mv_0$ and $mv_1$ are derived for the current block or when $mv_0$, $mv_1$, and $mv_2$ are derived for the current block, the encoding/decoding apparatus may provide the derived $mv_0$ and $mv_1$ as constructed candidates of the current block S1610.

Meanwhile, when only $mv_0$ and $mv_2$ are available for the current block, namely, when only $mv_0$ and $mv_2$ are derived for the current block, the encoding/decoding apparatus may derive $mv_1$ for the current block based on Eq. 9 above S1620. The encoding/decoding apparatus may derive $mv_1$ by inserting the derived $mv_0$ and $mv_2$ into Eq. 9 above.

Afterwards, the encoding/decoding apparatus may provide the derived $mv_0$ and $mv_1$ as constructed candidates of the current block S1610.

Meanwhile, another embodiment for deriving the inherited affine candidate according to the present disclosure will be proposed. In deriving an inherited affine candidate, the proposed embodiment may reduce computational complexity, thereby improving coding performance.

Figure 17:
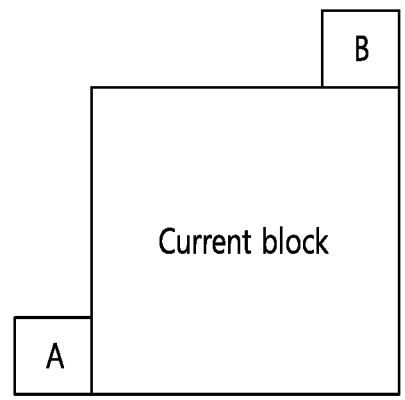
FIG. 17 illustrates positions of neighboring blocks scanned for deriving inherited affine candidates.

FIG. 17 illustrates positions of neighboring blocks scanned for deriving inherited affine candidates.

The encoding/decoding apparatus may derive up to two inherited affine candidates from neighboring blocks of the current block. FIG. 17 illustrates neighboring blocks for the inherited affine candidates. For example, the neighboring blocks may include neighboring block A and neighboring block B shown in FIG. 17. The neighboring block A may represent the left neighboring block A0, and the neighboring block B may represent the top neighboring block B0.

For example, the encoding/decoding apparatus may check availability of the neighboring blocks in a specific order and may derive an inherited affine candidate of the current block based on a neighboring block first confirmed as available. In other words, the encoding/decoding apparatus may check the neighboring blocks in a specific order to see whether the neighboring blocks satisfy a specific condition and derive an inherited affine candidate of the current block based on a neighboring block first confirmed as available. Also, the encoding/decoding apparatus may derive an inherited affine candidate of the current block based on a neighboring block second confirmed to satisfy the specific condition. In other words, the encoding/decoding apparatus may derive an inherited affine candidate of the current block based on a neighboring block second confirmed to satisfy the specific condition. Here, availability may mean that a block is coded based on affine motion model, and the reference picture of the block is the same as the reference picture of the current block. In other words, the specific condition may indicate that a block is coded based on affine motion model, and the reference picture of the block is the same as the reference picture of the current block. Also, for example, the specific order may be performed from neighboring block A to neighboring block B. Meanwhile, a pruning check process may not be performed between two inherited affine candidates (namely, derived inherited affine candidates). The pruning check process may represent a process that checks whether candidates are identical to each other and removes the candidate derived later if they are found to be identical.

The embodiment above proposes a method for checking only two neighboring blocks (namely, neighboring block A and neighboring block B) and deriving the inherited affine candidate instead of checking all the existing neighboring blocks (namely, neighboring block A, neighboring block B, neighboring block C, neighboring block D, and neighboring block E) and deriving the inherited affine candidate. Here, neighboring block C may represent the top-right corner neighboring block B 1, neighboring block D the bottom-left corner neighboring block A1, and neighboring block E the top-left corner neighboring block B2.

When affine prediction is applied to each neighboring block to analyze spatial correlation among the neighboring blocks and the current block, a probability that affine prediction is applied to the current block may be utilized. When affine prediction is applied to each neighboring block, the probability that affine prediction is applied to the current block may be derived as shown in the table below.

TABLE 2

| | Reference block | | | | |
|---|---|---|---|---|---|
| | A | B | C | D | E |
| Probability | 65% | 41% | 5% | 3% | 1% |

Referring to Table 2 above, it may be found that spatial correlation with the current block is high for neighboring block A and neighboring block B among the neighboring blocks. Therefore, through an embodiment that derives the inherited affine candidate by using only neighboring block A and neighboring block B that exhibit high spatial correlation, processing time may be reduced, and high decoding performance may be achieved.

Meanwhile, the pruning check process may be performed to prevent the same candidate from existing in the candidate list. Since the pruning check process may remove redundancy, an advantageous effect may be obtained in terms of encoding efficiency, but at the same time, computational complexity may be increased due to the pruning check process. In particular, since the pruning check process for affine candidates has to be performed in consideration of affine type (for example, whether affine motion model is four-parameter affine motion model or six-parameter affine motion model), reference picture (or reference picture index), and MVs of CP0, CP1, and CP2, computational complexity is quite high. Therefore, the present embodiment proposes a method which does not perform the pruning check process between the inherited affine candidate derived based on neighboring block A (for example, inherited_A) and the inherited affine candidate derived based on neighboring block B (for example, inherited_B). In the case of neighboring blocks A and B, they are distant from each other and thus show low spatial correlation; therefore, the possibility is low that inherited_A and inherited_B are the same. Therefore, it may be desirable that the pruning check process is not performed between the inherited affine candidates.

Also, based on the grounds above, a method for performing the pruning check process as little as possible may be proposed. For example, the encoding/decoding apparatus may perform the pruning check process in such a way that only the MVs of CP0 of the inherited affine candidates are compared with each other.

Also, the present disclosure proposes a method for deriving a constructed candidate different from that obtained by the embodiment above. Compared with the embodiment for deriving a constructed candidate above, the proposed embodiment may improve coding performance by reducing complexity. The proposed embodiment may be described as follows. Also, when the number of the inherited affine candidates available is less than 2 (namely when the number of inherited affine candidates derived is less than 2), constructed affine candidates may be considered.

For example, the encoding/decoding apparatus may check $mv_0$, $mv_1$, and $mv_2$ for the current block. In other words, the encoding/decoding apparatus may determine whether $mv_0$, $mv_1$, and $mv_2$ are available among neighboring blocks of the current block. Here, $mv_0$ may represent CPMVP candidate of CP0 of the current block, $mv_1$ may represent CPMVP candidate of CP1 of the current block, and $mv_2$ may represent CPMVP candidate of CP2 of the current block.

Specifically, the neighboring blocks of the current block may be divided into three groups, and the neighboring blocks may include a neighboring block A, a neighboring block B, a neighboring block C, a neighboring block D, a neighboring block E, a neighboring block F, and a neighboring block G. The first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

The encoding/decoding apparatus may determine availability of $mv_0$ within the first group, determine availability of $mv_1$ within the second group, and availability of $mv_2$ within the third group.

More specifically, for example, the encoding/decoding apparatus may check whether motion vectors of neighboring blocks within a first group satisfy a specific condition according to a specific order. The encoding/decoding apparatus may derive the motion vector of a neighboring block first confirmed to satisfy the condition during the checking process as $mv_0$. In other words, $mv_0$ may be the motion vector first confirmed to satisfy the specific condition from checking of motion vectors within the first group according to a specific order. If motion vectors of the neighboring blocks within the first group do not satisfy the specific condition, available $mv_0$ may not exist. Here, for example, the specific order may be performed in order of neighboring block A within the first group, neighboring block B, and neighboring block C. Also, for example, the specific condition may be such that the reference picture for a motion vector of a neighboring block is the same as the reference picture of the current block.

Also, the encoding/decoding apparatus may check whether motion vectors of neighboring blocks within a second group satisfy a specific condition according to a specific order. The encoding/decoding apparatus may derive the motion vector of a neighboring block first confirmed to satisfy the condition during the checking process as $mv_1$. In other words, $mv_1$ may be the motion vector first confirmed to satisfy the specific condition from checking of motion vectors within the second group according to a specific order. If motion vectors of the neighboring blocks within the second group do not satisfy the specific condition, available $mv_1$ may not exist. Here, for example, the specific order may be performed from neighboring block D within the second group to neighboring block E. Also, for example, the specific condition may be such that the reference picture for a motion vector of a neighboring block is the same as the reference picture of the current block.

Also, the encoding/decoding apparatus may check whether motion vectors of neighboring blocks within a third group satisfy a specific condition according to a specific order. The encoding/decoding apparatus may derive the motion vector of a neighboring block first confirmed to satisfy the condition during the checking process as $mv_2$. In other words, $mv_2$ may be the motion vector first confirmed to satisfy the specific condition from checking of motion vectors within the third group according to a specific order. If motion vectors of the neighboring blocks within the third group do not satisfy the specific condition, available $mv_2$ may not exist. Here, for example, the specific order may be performed from neighboring block F within the third group to neighboring block G. Also, for example, the specific condition may be such that the reference picture for a motion vector of a neighboring block is the same as the reference picture of the current block.

Afterwards, if the affine motion model applied to the current block is 4-parameter affine motion model, and $mv_0$ and $mv_1$ for the current block are available, the encoding/decoding apparatus may provide the derived $mv_0$ and $mv_1$ as constructed candidates of the current block. Meanwhile, if $mv_0$ and/or $mv_1$ for the current block is not available, namely, if at least one of $mv_0$ and $mv_1$ is not derived from neighboring blocks of the current block, the encoding/decoding apparatus may not add a constructed candidate to the affine MVP list of the current block.

Also, if the affine motion model applied to the current block is 6-parameter affine motion model, and $mv_0$, $mv_1$, and $mv_2$ for the current block are available, the encoding/decoding apparatus may provide the derived $mv_0$, $mv_1$, and $mv_2$ as constructed candidates of the current block. Meanwhile, if $mv_0$, $mv_1$, and/or $mv_2$ for the current block is not available, namely, if at least one of $mv_0$, $mv_1$, and $mv_2$ is not derived from neighboring blocks of the current block, the encoding/decoding apparatus may not add a constructed candidate to the affine MVP list of the current block.

The proposed embodiment describes a method that considers motion vectors of CPs for generating affine motion model of the current block as constructed candidates only when all the motion vectors are available. Here, availability may mean that the reference picture of a neighboring block is the same as the reference picture of the current block. In other words, the constructed candidate may be derived only when there exists a motion vector that satisfies the condition among motion vectors of neighboring blocks for the respective CPs of the current block. Therefore, if affine motion model applied to the current block is 4-parameter affine motion model, the constructed candidate may be considered only when motion vectors of CP0 and CP1 of the current block (namely, $mv_0$ and $mv_1$) are available. Also, if affine motion model applied to the current block is 6-parameter affine motion model, the constructed candidate may be considered only when motion vectors of CP0, CP1, and CP2 of the current block (namely, $mv_0$, $mv_1$, and $mv_2$) are available. Therefore, according to the proposed embodiment, the additional construction for deriving a motion vector for a CP based on Eq. 8 or 9 may not be needed. Through the proposed embodiment, computational complexity for deriving the constructed candidate may be reduced. Also, since the constructed candidate is determined only when the CPMVP candidate having the same reference picture is available, the overall coding performance may be improved.

Meanwhile, a pruning check process may not be performed between a derived inherited affine candidate and the constructed affine candidate. The pruning check process may represent a process that checks whether the candidates are identical to each other and removes the candidate derived later if they are found to be identical.

The embodiment described above may be illustrated as shown in FIGS. 18 and 19.

Figure 18:
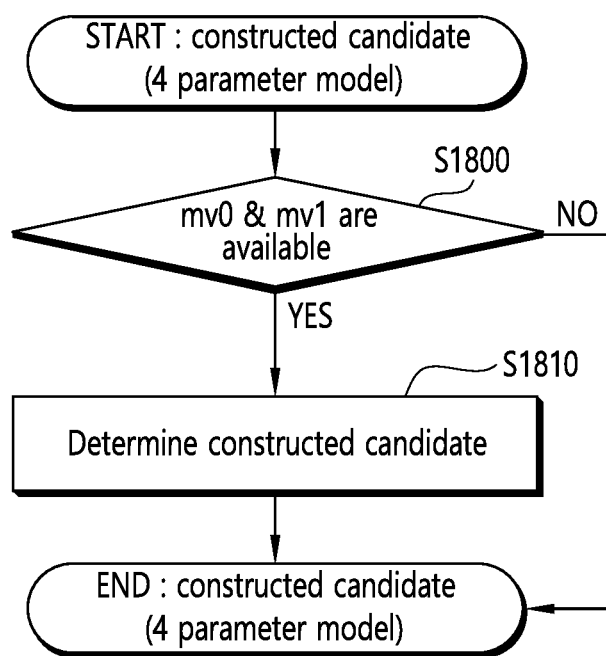
FIG. 18 illustrates one example of deriving the constructed candidate when four-parameter affine motion model is applied to the current block.

FIG. 18 illustrates one example of deriving the constructed candidate when four-parameter affine motion model is applied to the current block.

Referring to FIG. 18, the encoding/decoding apparatus may determine whether $mv_0$ and $mv_1$ for the current block are available S1800. In other words, the encoding/decoding apparatus may determine whether available $mv_0$ and $mv_1$ exist in the neighboring blocks of the current block. Here, $mv_0$ may be the CPMVP candidate of CP0 of the current block, and $mv_1$ may be the CPMVP candidate of CP1.

The encoding/decoding apparatus may determine whether $mv_0$ is available in the first group and whether $mv_1$ is available in the second group.

Specifically, the neighboring blocks of the current block may be divided into three groups, and the neighboring blocks may include a neighboring block A, a neighboring block B, a neighboring block C, a neighboring block D, a neighboring block E, a neighboring block F, and a neighboring block G. The first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

The encoding/decoding apparatus may check whether motion vectors of neighboring blocks within the first group satisfy a specific condition according to a specific order. The encoding/decoding apparatus may derive the motion vector of a neighboring block first confirmed to satisfy the condition during the checking process as $mv_0$. In other words, $mv_0$ may be the motion vector first confirmed to satisfy the specific condition from checking of motion vectors within the first group according to a specific order. If motion vectors of the neighboring blocks within the first group do not satisfy the specific condition, available $mv_0$ may not exist. Here, for example, the specific order may be performed in order of neighboring block A within the first group, neighboring block B, and neighboring block C. Also, for example, the specific condition may be such that the reference picture for a motion vector of a neighboring block is the same as the reference picture of the current block.

Also, the encoding/decoding apparatus may check whether motion vectors of neighboring blocks within the second group satisfy a specific condition according to a specific order. The encoding/decoding apparatus may derive the motion vector of a neighboring block first confirmed to satisfy the condition during the checking process as $mv_1$. In other words, $mv_1$ may be the motion vector first confirmed to satisfy the specific condition from checking of motion vectors within the second group according to a specific order. If motion vectors of the neighboring blocks within the second group do not satisfy the specific condition, available $mv_1$ may not exist. Here, for example, the specific order may be performed from neighboring block D within the second group to neighboring block E. Also, for example, the specific condition may be such that the reference picture for a motion vector of a neighboring block is the same as the reference picture of the current block.

If $mv_0$ and $mv_1$ for the current block are available, namely, if $mv_0$ and $mv_1$ for the current block are derived, the encoding/decoding apparatus may provide the derived $mv_0$ and $mv_1$ as constructed candidates of the current block S1810. Meanwhile, if $mv_0$ and/or $mv_1$ for the current block is not available, namely, if at least one of $mv_0$ and $mv_1$ is not derived from neighboring blocks of the current block, the encoding/decoding apparatus may not add a constructed candidate to the affine MVP list of the current block.

Meanwhile, a pruning check process may not be performed between a derived inherited affine candidate and the constructed affine candidate. The pruning check process may represent a process that checks whether the candidates are identical to each other and removes the candidate derived later if they are found to be identical.

Figure 19:
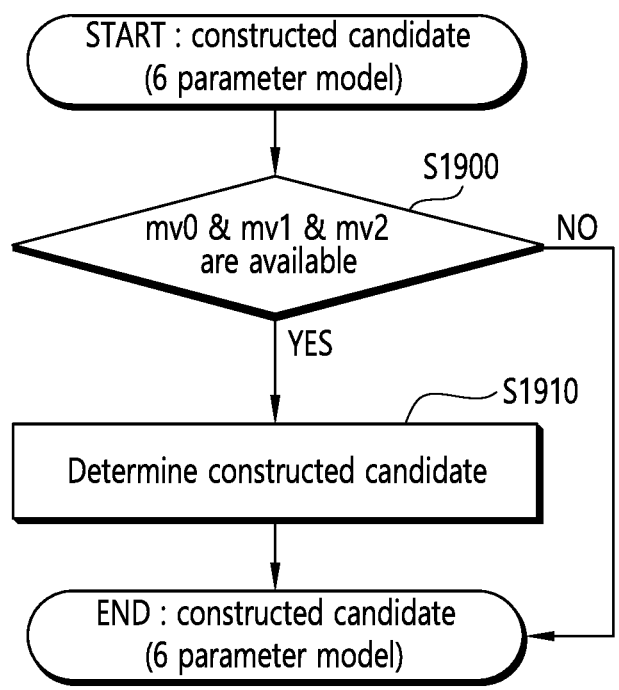
FIG. 19 illustrates one example of deriving the constructed candidate when six-parameter affine motion model is applied to the current block.

FIG. 19 illustrates one example of deriving the constructed candidate when six-parameter affine motion model is applied to the current block.

Referring to FIG. 19, the encoding/decoding apparatus may determine whether $mv_0$, $mv_1$, and $mv_2$ for the current block are available S1900. In other words, the encoding/decoding apparatus may determine whether available $mv_0$, $mv_1$, and $mv_2$ exist in the neighboring blocks of the current block. Here, $mv_0$ may be the CPMVP candidate of CP0 of the current block, $mv_1$ the CPMVP candidate of CP1, and $mv_2$ the CPMVP candidate of CP2.

The encoding/decoding apparatus may determine whether $mv_0$ is available in the first group, $mv_1$ in the second group, and $mv_2$ in the third group.

Specifically, the neighboring blocks of the current block may be divided into three groups, and the neighboring blocks may include a neighboring block A, a neighboring block B, a neighboring block C, a neighboring block D, a neighboring block E, a neighboring block F, and a neighboring block G. The first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

The encoding/decoding apparatus may check whether motion vectors of neighboring blocks within the first group satisfy a specific condition according to a specific order. The encoding/decoding apparatus may derive the motion vector of a neighboring block first confirmed to satisfy the condition during the checking process as $mv_0$. In other words, $mv_0$ may be the motion vector first confirmed to satisfy the specific condition from checking of motion vectors within the first group according to a specific order. If motion vectors of the neighboring blocks within the first group do not satisfy the specific condition, available $mv_0$ may not exist. Here, for example, the specific order may be performed in order of neighboring block A within the first group, neighboring block B, and neighboring block C. Also, for example, the specific condition may be such that the reference picture for a motion vector of a neighboring block is the same as the reference picture of the current block.

Also, the encoding/decoding apparatus may check whether motion vectors of neighboring blocks within the second group satisfy a specific condition according to a specific order. The encoding/decoding apparatus may derive the motion vector of a neighboring block first confirmed to satisfy the condition during the checking process as $mv_1$. In other words, $mv_1$ may be the motion vector first confirmed to satisfy the specific condition from checking of motion vectors within the second group according to a specific order. If motion vectors of the neighboring blocks within the second group do not satisfy the specific condition, available $mv_1$ may not exist. Here, for example, the specific order may be performed from neighboring block D within the second group to neighboring block E. Also, for example, the specific condition may be such that the reference picture for a motion vector of a neighboring block is the same as the reference picture of the current block.

Also, the encoding/decoding apparatus may check whether motion vectors of neighboring blocks within the third group satisfy a specific condition according to a specific order. The encoding/decoding apparatus may derive the motion vector of a neighboring block first confirmed to satisfy the condition during the checking process as $mv_2$. In other words, $mv_2$ may be the motion vector first confirmed to satisfy the specific condition from checking of motion vectors within the third group according to a specific order. If motion vectors of the neighboring blocks within the third group do not satisfy the specific condition, available $mv_2$ may not exist. Here, for example, the specific order may be performed from neighboring block F within the third group to neighboring block G. Also, for example, the specific condition may be such that the reference picture for a motion vector of a neighboring block is the same as the reference picture of the current block.

If $mv_0$, $mv_1$, and $mv_2$ for the current block are available, namely, if $mv_0$, and $mv_2$ for the current block are derived, the encoding/decoding apparatus may provide the derived $mv_0$, $mv_1$, and $mv_2$ as constructed candidates of the current block S1910. Meanwhile, if $mv_0$, $mv_1$, and/or $mv_2$ for the current block is not available, namely, if at least one of $mv_0$, $mv_1$, and $mv_2$ is not derived from neighboring blocks of the current block, the encoding/decoding apparatus may not add a constructed candidate to the affine MVP list of the current block.

Meanwhile, a pruning check process may not be performed between a derived inherited affine candidate and the constructed affine candidate.

Meanwhile, when the number of derived affine candidates is less than 2 (namely, when the number of inherited affine candidates and/or the number of constructed affine candidates is less than 2), an HEVC AMVP candidate may be added to the affine MVP list of the current block.

For example, the HEVC AMVP candidate may be derived in the following order.

More specifically, when the number of derived affine candidate is less than 2, and CPMV0 of the constructed affine candidate is available, the CPMV0 may be used as the affine MVP candidate. In other words, when the number of derived affine candidates is less than 2, and the CPMV0 of the constructed affined candidate is available (namely, when the number of derived affine candidates is less than 2, and CPMV0 of the constructed affine candidate is derived), the CPMV0 of the constructed affine candidate may be derived as a first affine MVP candidate including CPMV0, CPMV1, and CPMV2.

Also, next, when the number of derived affine candidates is less than 2, and the CPMV1 of the constructed affine candidate is available, the CPMV1 may be used as the affine MVP candidate. In other words, when the number of derived affine candidates is less than 2, and the CPMV1 of the constructed affined candidate is available (namely, when the number of derived affine candidates is less than 2, and CPMV1 of the constructed affine candidate is derived), the CPMV1 of the constructed affine candidate may be derived as a second affine MVP candidate including CPMV0, CPMV1, and CPMV2.

Also, next, when the number of derived affine candidates is less than 2, and the CPMV2 of the constructed affine candidate is available, the CPMV2 may be used as the affine MVP candidate. In other words, when the number of derived affine candidates is less than 2, and the CPMV2 of the constructed affined candidate is available (namely, when the number of derived affine candidates is less than 2, and CPMV2 of the constructed affine candidate is derived), the CPMV2 of the constructed affine candidate may be derived as a third affine MVP candidate including CPMV0, CPMV1, and CPMV2.

Also, next, when the number of derived affine candidates is less than 2, an HEVC Temporal Motion Vector Predictor (TMVP) may be used as the affine MVP candidate. The HEVC TMVP may be derived based on motion information of a temporal neighboring block of the current block. In other words, when the number of derived affine candidates is less than 2, a motion vector of a temporal neighboring block of the current block may be derived as the third affine MVP candidate including CPMV0, CPMV1, and CPMV2. The temporal neighboring block may indicate a collocated block within a collocated picture corresponding to the current block.

Also, next, when the number of derived affine candidates is less than 2, a zero motion vector (MV) may be used as the affine MVP candidate. In other words, when the number of derived affine candidates is less than 2, the zero motion vector may be derived as the third affine MVP candidate including CPMV0, CPMV1, and CPMV2. The zero motion vector may represent a motion vector whose elements are all zeros.

The processing steps using CPMVs of constructed affine candidates reuse the MVs already considered for generation of constructed affine candidates, thereby lowering processing complexity compared with the existing method for deriving HEVC AMVP candidates.

Meanwhile, the present disclosure proposes another embodiment for deriving the inherited affine candidate.

To derive the inherited affine candidate, affine prediction information of neighboring blocks is needed, and more specifically, affine prediction information is needed as follows:

1) Affine flag (affine_flag) indicating whether affine prediction-based encoding has been applied to the neighboring blocks, and 2) Motion information of the neighboring blocks.

If four-parameter affine motion model is applied to the neighboring blocks, motion information of the neighboring blocks may include L0 motion information and L1 motion information for CP0, and L0 motion information and L1 motion information for CP1. Also, if six-parameter affine motion model is applied to the neighboring blocks, motion information of the neighboring blocks may include L0 motion information and L1 motion information for CP0, and L0 motion information and L1 motion information for CP2. Here, the L0 motion information may represent motion information for List 0 (L0), and the L1 motion information may represent motion information for List 1 (L1). The L0 motion information may include L0 reference picture index and L0 motion vector, and the L1 motion information may include L1 reference picture index and L1 motion vector.

As described above, in the case of affine prediction, a large amount of information has to be stored, which may be the primary cause that increases hardware cost in actual implementation of an encoding/decoding apparatus. In particular, if a neighboring block is located above a current block and belongs to the CTU boundary, a line buffer needs to be used to store information related to affine prediction of the neighboring block, which may further increase the implementation cost. In what follows, the problem may be referred to as a line buffer issue. In this regard, the present disclosure proposes an embodiment for deriving an inherited affine candidate that minimizes the hardware cost by not storing or by reducing affine prediction-related information in the line buffer. The proposed embodiment may improve coding performance by reducing computational complexity in deriving the inherited affine candidate. Meanwhile, it should be noted that the line buffer already stores motion information on a block of 4×4 size, and if the affine prediction-related information is additionally stored, the amount of information stored may be increased three times the existing amount of storage.

In the present embodiment, no additional information on affine prediction may be stored in the line buffer, and when the information within the line buffer has to be utilized to generate the inherited affine candidate, generation of the inherited affine candidate may be limited.

Figure 20A:
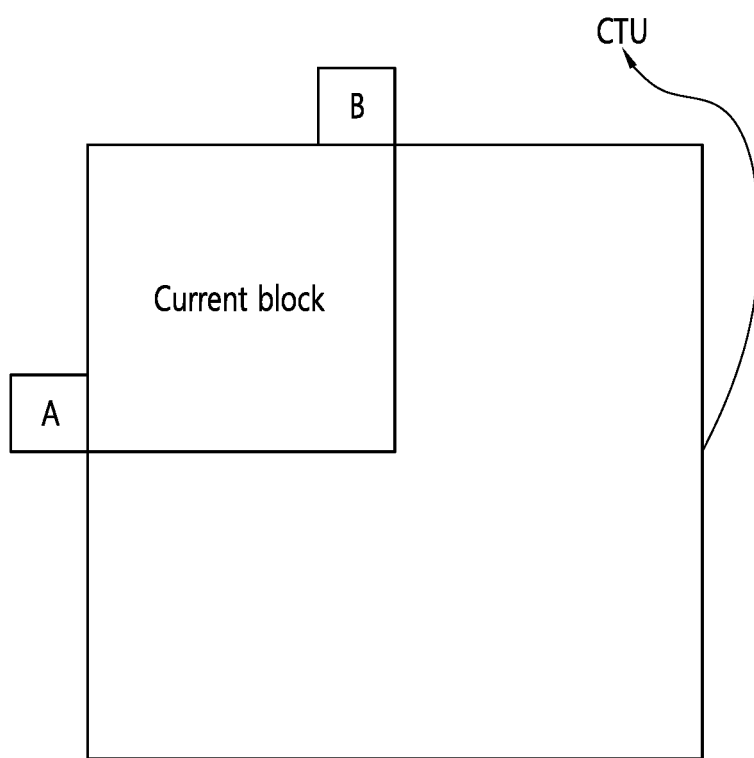
FIGS. 20a to 20b illustrate an embodiment for deriving the inherited affine candidate.
Figure 20B:
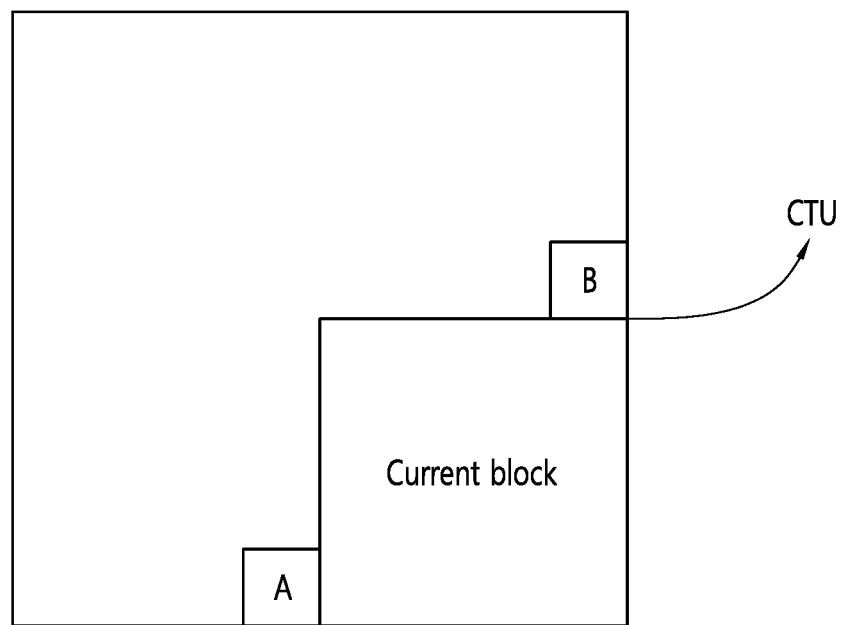

FIGS. 20a to 20b illustrate an embodiment for deriving the inherited affine candidate.

Referring to FIG. 20a, when neighboring block B of the current block (namely, the neighboring block above the current block) does not belong to the same CTU as the current block, the neighboring block B may not be used for generation of the inherited affine candidate. Meanwhile, although neighboring block A also does not belong to the same CTU as the current block, information on the neighboring block A is not stored in the line buffer, and thus the neighboring block A may be used for generation of the inherited affine candidate. Therefore, according to the present embodiment, only when the neighboring block above the current block belongs to the same CTU as the current block, the neighboring block may be used for deriving the inherited affine candidate. Also, when the neighboring block above the current block does not belong to the same CTU as the current block, the top neighboring block may not be used for deriving the inherited affine candidate.

Referring to FIG. 20b, neighboring block B of the current block (namely, the neighboring block above the current block) may belong to the same CTU as the current block. In this case, the encoding/decoding apparatus may generate the inherited affine candidate by referring to the neighboring block B.

Figure 21:
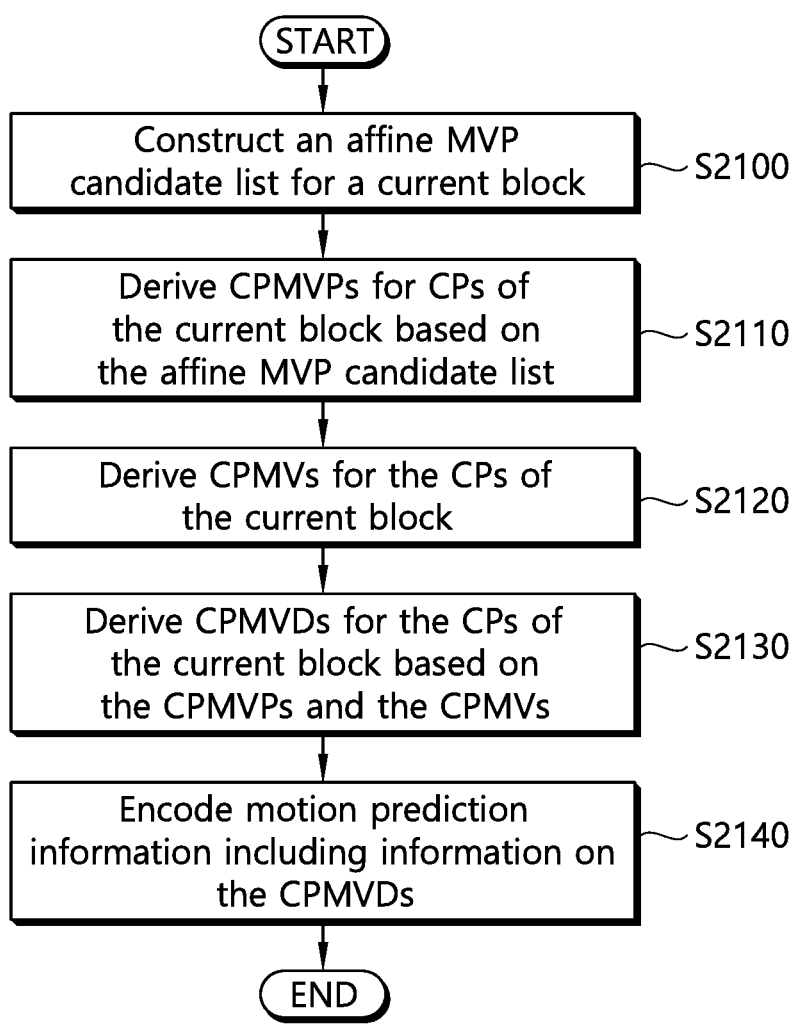
FIG. 21 illustrates a video encoding method performed by encoding apparatus according to the present disclosure.

FIG. 21 illustrates a video encoding method performed by an encoding apparatus according to the present disclosure. The method disclosed in FIG. 21 may be performed by the encoding apparatus disclosed in FIG. 2. More specifically, for example, S2100 to S2120 steps may be performed by the predictor of the encoding apparatus, S2130 step by the subtractor of the encoding apparatus, and S2140 step by the entropy encoder of the encoding apparatus. Also, although not shown in the figure, the process for deriving prediction samples for the current block based on the CPMVs may be performed by the predictor of the encoding apparatus, the process for deriving residual samples for the current block based on the original samples and prediction samples for the current block may be performed by the subtractor of the encoding apparatus, the process for generating information on residuals for the current block based on the residual samples may be performed by the transformer of the encoding apparatus, and the process for encoding information on the residuals may be performed by the encoder of the encoding apparatus.

The encoding apparatus constructs an affine Motion Vector Predictor (MVP) candidate list for the current block S2100. The encoding apparatus may construct an affine MVP candidate list including affine MVP candidates for the current block. The maximum number of the affine MVP candidates of the affine MVP candidate list may be 2.

Also, as one example, the affine MVP candidate list may include inherited affine MVP candidates. The encoding apparatus may check whether inherited affine MVP candidates of the current block are available, and if the inherited affine MVP candidates are available, the inherited affine MVP candidate may be derived. For example, the inherited affine MVP candidates may be derived based on neighboring blocks of the current block, and the maximum number of the inherited affine MVP candidates may be 2. Availability of the neighboring blocks may be checked in a specific order, and the inherited affine MVP candidates may be derived based on available neighboring blocks checked. In other words, availability of the neighboring blocks may be checked in a specific order, a first inherited affine MVP candidate may be derived based on the available neighboring block checked first, and a second inherited affine MVP candidate may be derived based on the available neighboring block checked second. The availability may mean that a neighboring block is coded based on affine motion model, and the reference picture of the neighboring block is the same as the reference picture of the current block. In other words, an available neighboring block may refer to a neighboring block coded according to affine motion model (namely, a neighboring block to which affine prediction is applied) and whose reference picture is the same as the reference picture of the current block. More specifically, the encoding apparatus may derive motion vectors for CPs of the current block based on the affine motion model of the available neighboring block checked first and derive the first inherited affine MVP candidate including the motion vectors as CPMVP candidates. Also, the encoding apparatus may derive motion vectors for CPs of the current block based on the affine motion model of the available neighboring block checked second and derive the second inherited affine MVP candidate including the motion vectors as CPMVP candidates. The affine motion model may be derived by Eq. 1 or Eq. 3 above.

Also, in other words, the neighboring blocks may be checked in a specific order to see whether the neighboring blocks satisfy a specific condition, and the inherited affine MVP candidates may be derived based on neighboring blocks satisfying the checked specific condition. In other words, the neighboring blocks may be checked in a specific order to see whether the neighboring blocks satisfy the specific condition, a first inherited affine MVP candidate may be derived based on the neighboring block first checked to satisfy the specific condition, and a second inherited affine MVP candidate may be derived based on the neighboring block second checked to satisfy the specific condition. More specifically, the encoding apparatus may derive motion vectors for CPs of the current block based on the affine motion model of the neighboring blocks first checked to satisfy the specific condition and derive the first inherited affine MVP candidate including the motion vectors as CPMVP candidates. Also, the encoding apparatus may derive motion vectors for CPs of the current block based on the affine motion model of the neighboring blocks second checked to satisfy the specific condition and derive the second inherited affine MVP candidate including the motion vectors as CPMVP candidates. The affine motion model may be derived by Eq. 1 or Eq. 3 above. Meanwhile, the specific condition may indicate that the neighboring block is coded according to affine motion model, and the reference picture of the neighboring block is the same as the reference picture of the current block. In other words, the neighboring block satisfying the specific condition may be coded according to affine motion model (namely, affine prediction is applied to the neighboring block), and the reference picture is the same as the reference picture of the current block.

Here, for example, the neighboring blocks may include the left neighboring block, top neighboring block, top-right corner neighboring block, bottom-left corner neighboring block, and top-left corner neighboring block of the current block. In this case, the specific order may be an order from the left neighboring block to the bottom-left corner neighboring block to the top neighboring block to the top-right corner neighboring block to the top-left corner neighboring block.

Or, for example, the neighboring blocks may include only the left neighboring block and the top neighboring block. In this case, the specific order may be an order from the left neighboring block to the top neighboring block.

Or, for example, the neighboring blocks may include the left neighboring block, and if the top neighboring block belongs to the current CTU which includes the current block, the neighboring blocks may further include the top neighboring block. In this case, the specific order may be an order from the left neighboring block to the top neighboring block. Also, if the top neighboring block does not belong to the current CTU, the neighboring blocks may not include the top neighboring block. In this case, only the left neighboring block may be checked.

Meanwhile, when a size of the current block is W×H, x component of the top-left sample position of the current block is 0, and y component thereof is 0, the bottom-left corner neighboring block may be the block including a sample at the coordinates of (−1, H), the left neighboring block may be the block including a sample at the coordinates of (01, H−1), the top-right corner neighboring block may be the block including a sample at the coordinates of (W, −1), the top neighboring block may be the block including a sample at the coordinates of (W−1, −1), the top-left corner neighboring block may be the block including a sample at the coordinates of (−1, −1). In other words, the left neighboring block may be the left neighboring block at the lowest position among the left neighboring blocks of the current block, and the top neighboring block may be the top neighboring block at the most left position among the top neighboring blocks of the current block.

Also, as one example, if a constructed affine MVP candidate is available, the affine MVP candidate list may include the constructed affine MVP candidate. The encoding apparatus may check whether the constructed affine MVP candidate of the current block is available, and if the constructed affine MVP candidate is available, the constructed affine MVP candidate may be derived. Also, for example, after the inherited affine MVP candidate is derived, the constructed affine MVP candidate may be derived. If the number of derived affine MVP candidates (namely, the number of inherited affine MVPs) is less than 2, and the constructed affine MVP candidate is available, the affine MVP candidate list may include the constructed affine MVP candidate. Here, the constructed affine MVP candidate may include candidate motion vectors for the CPs. The constructed affine MVP candidate may be available when all the candidate motion vectors are available.

For example, if four-parameter affine motion model is applied to the current block, the CPs of the current block may include CP0 and CP1. If the candidate motion vector for the CP0 is available, and the candidate motion vector for the CP1 is available, the constructed affine MVP candidate may be available, and the affine MVP candidate list may include the constructed affine MVP candidate. Here, the CP0 may represent the top-left position of the current block, and the CP1 may represent the top-right position of the current block.

The constructed affine MVP candidate may include the candidate motion vector for CP0 and the candidate motion vector for CP1. The candidate motion vector for CP0 may be the motion vector of a first block, and the candidate motion vector for CP1 may be the motion vector of a second block.

Also, the first block may be a block which has been first confirmed while checking neighboring blocks in the first group in a first specific order to be that a reference picture thereof is the same as a reference picture of the current block. In other words, the candidate motion vector for CP1 may be the motion vector of the block whose reference picture first confirmed by checking neighboring blocks within the first group according to a first order is the same as the reference picture of the current block. The availability may indicate that the neighboring block exists, and the neighboring block is coded by inter prediction. Here, if the reference picture of the first block within the first group is the same as the reference picture of the current block, the candidate motion vector for CP0 may be available. Also, for example, the first group may include neighboring block A, neighboring block B, and neighboring block C, and the first specific order may be an order from the neighboring block A to the neighboring block B, and then to the neighboring block C.

Also, the second block may be a block which has been first confirmed while checking neighboring blocks in the second group in a second specific order to be that a reference picture thereof is the same as a reference picture of the current block. Here, if the reference picture of the second block within the second group is the same as the reference picture of the current block, the candidate motion vector for CP1 may be available. Also, for example, the second group may include neighboring block D and neighboring block E, and the second specific order may be an order from the neighboring block D to the neighboring block E.

Meanwhile, when a size of the current block is W×H, x component of the top-left sample position of the current block is 0, and y component thereof is 0, neighboring block A may be the block including a sample at the coordinates of (−1, −1), neighboring block B may be the block including a sample at the coordinates of (0, −1), neighboring block C may be the block including a sample at the coordinates of (−1, 0), neighboring block D may be the block including a sample at the coordinates of (W−1, −1), and neighboring block E may be the block including a sample at the coordinates of (W, −1). In other words, neighboring block A may be the top-left corner neighboring block of the current block, neighboring block B the top neighboring block at the most left position among top neighboring blocks of the current block, neighboring block C the left neighboring block at the highest position among left neighboring blocks of the current block, neighboring block D the top neighboring block at the most right position among top neighboring blocks of the current block, and neighboring block E the top-right corner neighboring block of the current block.

Meanwhile, if at least one of the candidate motion vector of CP0 and the candidate motion vector of CP1 is not available, the constructed affine MVP candidate may not be available.

Or, for example, if six-parameter affine motion model is applied to the current block, the CPs of the current block may include CP0, CP1, and CP2. If the candidate motion vector for the CP0 is available, the candidate motion vector for the CP1 is available, and the candidate motion vector for the CP2 is available, the constructed affine MVP candidate may be available, and the affine MVP candidate list may include the constructed affine MVP candidate. Here, the CP0 may represent the top-left position of the current block, the CP1 may represent the top-right position of the current block, and the CP2 may represent the bottom-left position of the current block.

The constructed affine MVP candidate may include the candidate motion vector for CP0, the candidate motion vector for CP1, and the candidate motion vector for CP2. The candidate motion vector for CP0 may be the motion vector of a first block, the candidate motion vector for CP1 may be the motion vector of a second block, and the candidate motion vector for CP2 may be the motion vector of a third block.

Also, the first block may be a block which has been first confirmed while checking neighboring blocks in the first group in a first specific order to be that a reference picture thereof is the same as a reference picture of the current block. Here, if the reference picture of the first block within the first group is the same as the reference picture of the current block, the candidate motion vector for CP0 may be available. Also, for example, the first group may include neighboring block A, neighboring block B, and neighboring block C, and the first specific order may be an order from the neighboring block A to the neighboring block B, and then to the neighboring block C.

Also, the second block may be a block which has been first confirmed while checking neighboring blocks in the second group in a second specific order to be that a reference picture thereof is the same as a reference picture of the current block. Here, if the reference picture of the second block within the second group is the same as the reference picture of the current block, the candidate motion vector for CP1 may be available. Also, for example, the second group may include neighboring block D and neighboring block E, and the second specific order may be an order from the neighboring block D to the neighboring block E.

Also, the third block may be a block which has been first confirmed while checking neighboring blocks in the third group in a third specific order to be that a reference picture thereof is the same as a reference picture of the current block. Here, if the reference picture of the third block within the third group is the same as the reference picture of the current block, the candidate motion vector for CP2 may be available. Also, for example, the third group may include neighboring block F and neighboring block G, and the third specific order may be an order from the neighboring block F to the neighboring block G.

Meanwhile, when a size of the current block is W×H, x component of the top-left sample position of the current block is 0, and y component thereof is 0, neighboring block A may be the block including a sample at the coordinates of (−1, −1), neighboring block B may be the block including a sample at the coordinates of (0, −1), neighboring block C may be the block including a sample at the coordinates of (−1, 0), neighboring block D may be the block including a sample at the coordinates of (W−1, −1), neighboring block E may be the block including a sample at the coordinates of (W, −1), and neighboring block F may be the block including a sample at the coordinates of (−1, H−1), and neighboring block G may be the block including a sample at the coordinates of (−1, H). In other words, neighboring block A may be the top-left corner neighboring block of the current block, neighboring block B the top neighboring block at the most left position among top neighboring blocks of the current block, neighboring block C the left neighboring block at the highest position among left neighboring blocks of the current block, neighboring block D the top neighboring block at the most right position among top neighboring blocks of the current block, neighboring block E the top-right corner neighboring block of the current block, neighboring block F the left neighboring block at the lowest position among left neighboring blocks of the current block, and neighboring block G the bottom-left corner neighboring block of the current block.

Meanwhile, if at least one of the candidate motion vector of CP0, the candidate motion vector of CP1, and the candidate motion vector of CP2 is not available, the constructed affine MVP candidate may not be available.

Afterwards, the affine MVP candidate list may be derived based on the steps described below.

For example, when the number of derived affine MVP candidates is less than 2, and the motion vector for CP0 is available, the encoding apparatus may derive a first affine MVP candidate. Here, the first affine MVP candidate may be the affine MVP candidate including the motion vector for CP0 as the candidate motion vectors for the CPs.

Also, for example, when the number of derived affine MVP candidates is less than 2, and the motion vector for CP1 is available, the encoding apparatus may derive a second affine MVP candidate. Here, the second affine MVP candidate may be the affine MVP candidate including the motion vector for CP1 as the candidate motion vectors for the CPs.

Also, for example, when the number of derived affine MVP candidates is less than 2, and the motion vector for CP2 is available, the encoding apparatus may derive a third affine MVP candidate. Here, the third affine MVP candidate may be the affine MVP candidate including the motion vector for CP2 as the candidate motion vectors for the CPs.

Also, for example, when the number of derived affine MVP candidates is less than 2, the encoding apparatus may derive a fourth affine MVP candidate including a temporal MVP derived based on a temporal neighboring block of the current block as the candidate motion vectors for the CPs. The temporal neighboring block may refer to the same collocated block within the same collocated picture corresponding to the current block. The temporal MVP may be derived based on the motion vector of the temporal neighboring block.

Also, for example, when the number of derived affine MVP candidates is less than 2, the encoding apparatus may derive a fifth affine MVP candidate including a zero motion vector as the candidate motion vectors for the CPs. The zero motion vector may represent a motion vector whose elements are all zeros.

The encoding apparatus derives Control Point Motion Vector Predictors (CPMVPs) for Control Points (CPs) of the current block based on the affine MVP candidate list S2110. The encoding apparatus may derive CPMVs for the CPs of the current block exhibiting the optimal RD cost and may select, among the affine MVP candidates, an affine MVP candidate most similar to the CPMVs as the affine MVP candidate for the current block. The encoding apparatus may derive CPMVPs for CPs of the current block based on the affine MVP candidate selected among the affine MVP candidates. More specifically, if an affine MVP candidate includes a candidate motion vector for CP0 and a candidate motion vector for CP1, the candidate motion vector for CP0 of the affine MVP candidate may be derived as CPMVP of the CP0, and the candidate motion vector for CP1 of the affine MVP candidate may be derived as CPMVP of the CP1. Also, if an affine MVP candidate includes a candidate motion vector for CP0, a candidate motion vector for CP1, and a candidate motion vector for CP2, the candidate motion vector for CP0 of the affine MVP candidate may be derived as CPMVP of the CP0, the candidate motion vector for CP1 of the affine MVP candidate may be derived as CPMVP of the CP1, and the candidate motion vector for CP2 of the affine MVP candidate may be derived as CPMVP of the CP2. Also, if an affine MVP candidate includes a candidate motion vector for CP0 and a candidate motion vector for CP2, the candidate motion vector for CP0 of the affine MVP candidate may be derived as CPMVP of the CP0, and the candidate motion vector for CP2 of the affine MVP candidate may be derived as CPMVP of the CP2.

The encoding apparatus may encode an affine MVP candidate index indicating the selected affine MVP candidate among the affine MVP candidates. The affine MVP candidate index may indicate the one affine MVP candidate among affine MVP candidates included in the affine motion vector predictor (MVP) candidate list for the current block.

The encoding apparatus derives CPMVs for the CPs of the current block S2120. The encoding apparatus may derive CPMVs for the respective CPs of the current block.

The encoding apparatus derives Control Point Motion Vector Differences (CPMVDs) for the CPs of the current block based on the CPMVPs and the CPMVs S2130. The encoding apparatus may derive CPMVDs for the CPs of the current block based on the CPMVPs and the CPMVs for the respective CPs.

The encoding apparatus encodes motion prediction information including information on the CPMVDs S2140. The encoding apparatus may output the motion prediction information including the information on the CPMVDs in the form of a bitstream. In other words, the encoding apparatus may output image information including the motion prediction information in the form of a bitstream. The encoding apparatus may encode information on the CPMVDs for the respective CPs, where the motion prediction information may include information on the CPMVDs.

Also, the motion prediction may include the affine MVP candidate index. The affine MVP candidate index may indicate the selected affine MVP candidate among affine MVP candidates included in the affine Motion Vector Predictor (MVP) candidate list for the current block.

Meanwhile, as one example, the encoding apparatus may derive prediction samples for the current block based on the CPMVs, derive residual samples for the current block based on the original samples and prediction samples for the current block, generate information on the residuals for the current block based on the residual samples, and encode information on the residuals. The image information may include information on the residuals.

Meanwhile, the bitstream may be transmitted to the decoding apparatus through a network or a (digital) storage medium. Here, the network may include a broadcast network and/or a communication network, and the digital storage medium may include various types of storage media including USB, SD, CD, DVD, Bluray, HDD, and SSD.

Figure 22:
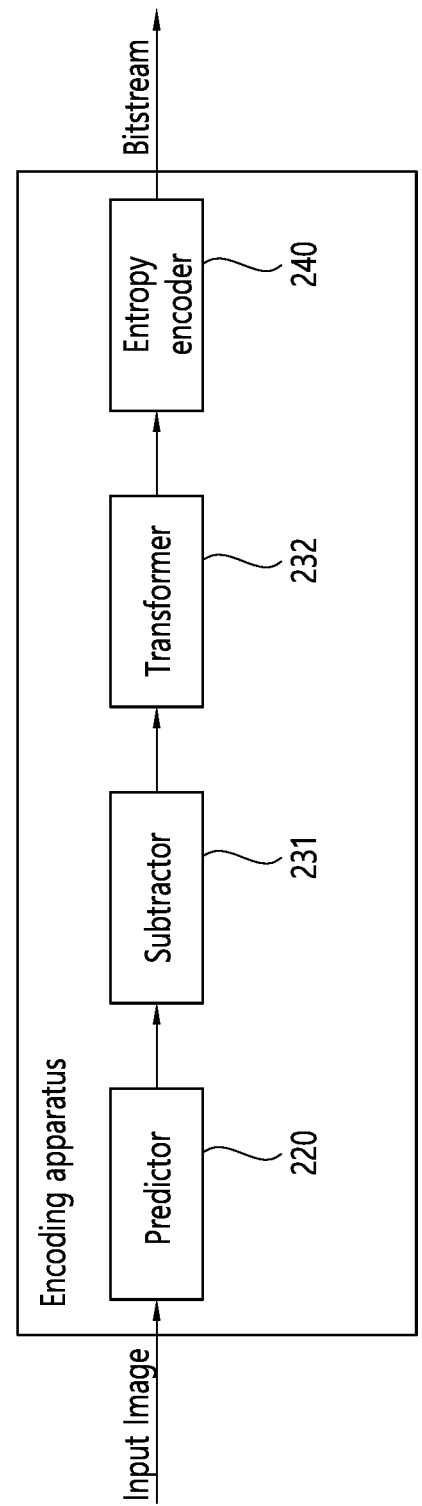
FIG. 22 illustrates an encoding apparatus performing a video encoding method according to the present disclosure.

FIG. 22 illustrates an encoding apparatus performing a video encoding method according to the present disclosure. The method disclosed in FIG. 21 may be performed by the encoding apparatus disclosed in FIG. 22. More specifically, for example, the predictor of the encoding apparatus may perform S2100 to S2130 step of FIG. 21, and the entropy encoder of the encoding apparatus of FIG. 22 may perform S2140 step of FIG. 21. Also, although not shown in the figure, a process for deriving prediction samples for the current block based on the CPMVs may be performed by the predictor of the encoding apparatus of FIG. 22, a process for deriving residual samples for the current block based on the original samples and the prediction samples for the current block may be performed by the subtractor of the encoding apparatus of FIG. 22, a process for generating information on the residuals for the current block based on the residual samples may be performed by the transformer of the encoding apparatus, and a process for encoding information on the residuals may be performed by the entropy encoder of the encoding apparatus of FIG. 22.

Figure 23:
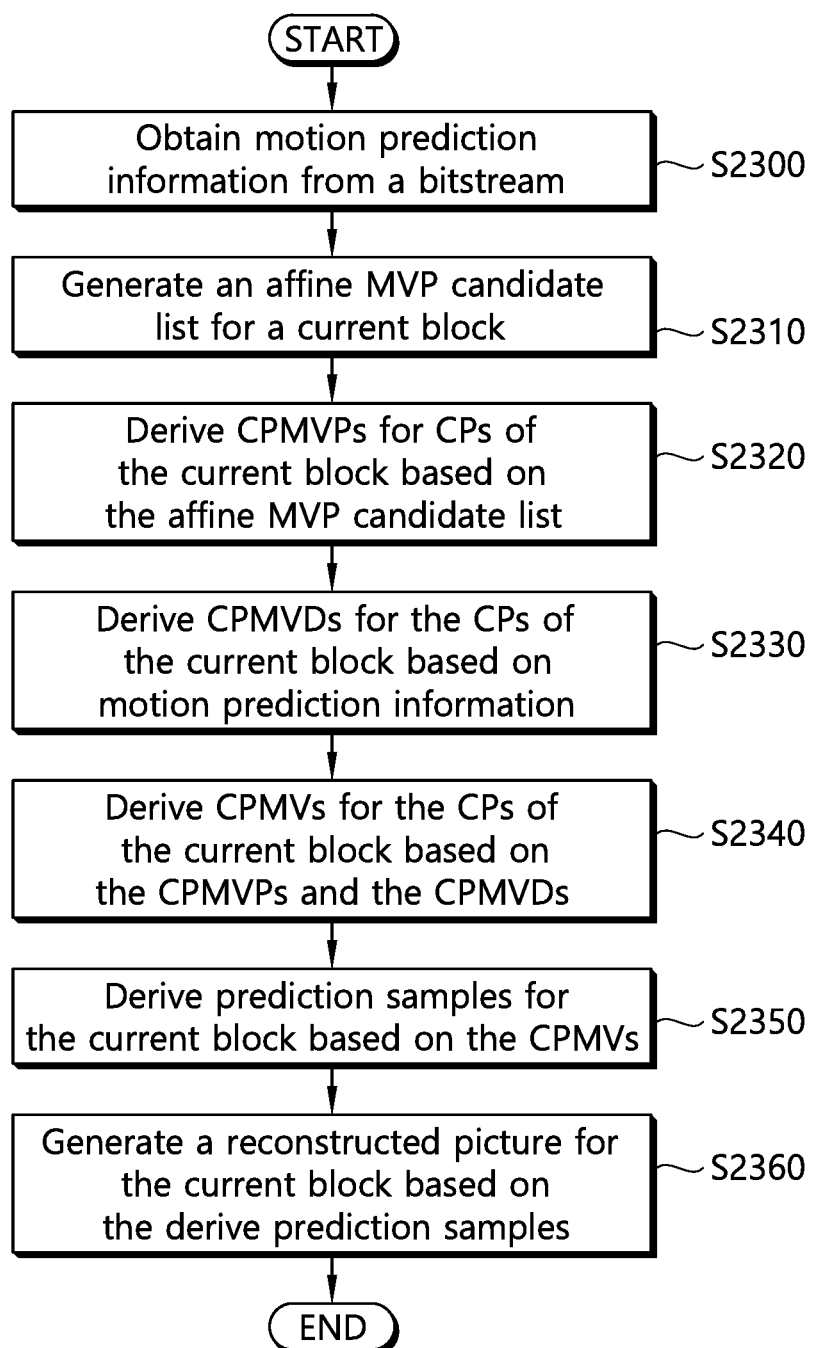
FIG. 23 illustrates a video decoding method performed by a decoding apparatus according to the present disclosure.

FIG. 23 illustrates a video decoding method performed by a decoding apparatus according to the present disclosure. The method disclosed in FIG. 23 may be performed by the decoding apparatus disclosed in FIG. 3. More specifically, for example, S2300 step of FIG. 23 may be performed by the entropy decoder of the decoding apparatus, S2310 to S2350 steps may be performed by the predictor of the decoding apparatus, and S2360 step may be performed by the adder of the decoding apparatus. Also, although not shown in the figure, a process for obtaining information on residuals of a current block through a bitstream may be performed by the entropy decoder of the decoding apparatus, and a process for deriving the residual samples for the current block based on the residual information may be performed by the inverse transformer of the decoding apparatus.

The decoding apparatus obtains motion prediction information on a current block from a bitstream S2300. The decoding apparatus may obtain image information including the motion prediction information from the bitstream.

Also, for example, the motion prediction information may include information on Control Point Motion Vector Differences (CPMVDs) for Control Points (CPs) of the current block. In other words, the motion prediction information may include information on the CPMVDs for the respective CPs of the current block.

Also, for example, the motion prediction information may include an affine Motion Vector Predictor (MVP) candidate index for the current block. The affine MVP candidate index may indicate one of the affine MVP candidates included in the affine MVP candidate list for the current block.

The decoding apparatus constructs an affine MVP candidate list for the current block S2310. The decoding apparatus may construct an affine MVP candidate list including affine MVP candidates for the current block. The maximum number of the affine MVP candidates of the affine MVP candidate list may be 2.

Also, as one example, the affine MVP candidate list may include inherited affine MVP candidates. The decoding apparatus may check whether inherited affine MVP candidates of the current block are available, and if the inherited affine MVP candidates are available, the inherited affine MVP candidate may be derived. For example, the inherited affine MVP candidates may be derived based on neighboring blocks of the current block, and the maximum number of the inherited affine MVP candidates may be 2. Availability of the neighboring blocks may be checked in a specific order, and the inherited affine MVP candidates may be derived based on available neighboring blocks checked. In other words, availability of the neighboring blocks may be checked in a specific order, a first inherited affine MVP candidate may be derived based on the available neighboring block checked first, and a second inherited affine MVP candidate may be derived based on the available neighboring block checked second. The availability may mean that a neighboring block is coded based on affine motion model, and the reference picture of the neighboring block is the same as the reference picture of the current block. In other words, an available neighboring block may refer to a neighboring block coded according to affine motion model (namely, a neighboring block to which affine prediction is applied) and whose reference picture is the same as the reference picture of the current block. More specifically, the decoding apparatus may derive motion vectors for CPs of the current block based on the affine motion model of the available neighboring block checked first and derive the first inherited affine MVP candidate including the motion vectors as CPMVP candidates. Also, the decoding apparatus may derive motion vectors for CPs of the current block based on the affine motion model of the available neighboring block checked second and derive the second inherited affine MVP candidate including the motion vectors as CPMVP candidates. The affine motion model may be derived by Eq. 1 or Eq. 3 above.

Also, in other words, the neighboring blocks may be checked in a specific order to see whether the neighboring blocks satisfy a specific condition, and the inherited affine MVP candidates may be derived based on neighboring blocks satisfying the checked specific condition. In other words, the neighboring blocks may be checked in a specific order to see whether the neighboring blocks satisfy the specific condition, a first inherited affine MVP candidate may be derived based on the neighboring block first checked to satisfy the specific condition, and a second inherited affine MVP candidate may be derived based on the neighboring block second checked to satisfy the specific condition. More specifically, the decoding apparatus may derive motion vectors for CPs of the current block based on the affine motion model of the neighboring blocks first checked to satisfy the specific condition and derive the first inherited affine MVP candidate including the motion vectors as CPMVP candidates. Also, the decoding apparatus may derive motion vectors for CPs of the current block based on the affine motion model of the neighboring blocks second checked to satisfy the specific condition and derive the second inherited affine MVP candidate including the motion vectors as CPMVP candidates. The affine motion model may be derived by Eq. 1 or Eq. 3 above. Meanwhile, the specific condition may indicate that the neighboring block is coded according to affine motion model, and the reference picture of the neighboring block is the same as the reference picture of the current block. In other words, the neighboring block satisfying the specific condition may be coded according to affine motion model (namely, affine prediction is applied to the neighboring block), and the reference picture is the same as the reference picture of the current block.

Here, for example, the neighboring blocks may include the left neighboring block, top neighboring block, top-right corner neighboring block, bottom-left corner neighboring block, and top-left corner neighboring block of the current block. In this case, the specific order may be an order from the left neighboring block to the bottom-left corner neighboring block to the top neighboring block to the top-right corner neighboring block to the top-left corner neighboring block.

Or, for example, the neighboring blocks may include only the left neighboring block and the top neighboring block. In this case, the specific order may be an order from the left neighboring block to the top neighboring block.

Or, for example, the neighboring blocks may include the left neighboring block, and if the top neighboring block belongs to the current CTU which includes the current block, the neighboring blocks may further include the top neighboring block. In this case, the specific order may be an order from the left neighboring block to the top neighboring block. Also, if the top neighboring block does not belong to the current CTU, the neighboring blocks may not include the top neighboring block. In this case, only the left neighboring block may be checked. In other words, if the top neighboring block of the current block belongs to the current Coding Tree Unit (CTU) including the current block, the top neighboring block may be used for deriving the inherited affine MVP candidate, and if the top neighboring block of the current block does not belong to the current CTU, the top neighboring block may not be used for deriving the inherited affine MVP candidate.

Meanwhile, when a size of the current block is W×H, x component of the top-left sample position of the current block is 0, and y component thereof is 0, the bottom-left corner neighboring block may be the block including a sample at the coordinates of (−1, H), the left neighboring block may be the block including a sample at the coordinates of (01, H−1), the top-right corner neighboring block may be the block including a sample at the coordinates of (W, −1), the top neighboring block may be the block including a sample at the coordinates of (W−1, −1), the top-left corner neighboring block may be the block including a sample at the coordinates of (−1, −1). In other words, the left neighboring block may be the left neighboring block at the lowest position among the left neighboring blocks of the current block, and the top neighboring block may be the top neighboring block at the most left position among the top neighboring blocks of the current block.

Also, as one example, if a constructed affine MVP candidate is available, the affine MVP candidate list may include the constructed affine MVP candidate. The decoding apparatus may check whether the constructed affine MVP candidate of the current block is available, and if the constructed affine MVP candidate is available, the constructed affine MVP candidate may be derived. Also, for example, after the inherited affine MVP candidate is derived, the constructed affine MVP candidate may be derived. If the number of derived affine MVP candidates (namely, the number of inherited affine MVPs) is less than 2, and the constructed affine MVP candidate is available, the affine MVP candidate list may include the constructed affine MVP candidate. Here, the constructed affine MVP candidate may include candidate motion vectors for the CPs. The constructed affine MVP candidate may be available when all the candidate motion vectors are available.

For example, if four-parameter affine motion model is applied to the current block, the CPs of the current block may include CP0 and CP1. If the candidate motion vector for the CP0 is available, and the candidate motion vector for the CP1 is available, the constructed affine MVP candidate may be available, and the affine MVP candidate list may include the constructed affine MVP candidate. Here, the CP0 may represent the top-left position of the current block, and the CP1 may represent the top-right position of the current block.

The constructed affine MVP candidate may include the candidate motion vector for CP0 and the candidate motion vector for CP1. The candidate motion vector for CP0 may be the motion vector of a first block, and the candidate motion vector for CP1 may be the motion vector of a second block.

Also, the first block may be a block which has been first confirmed while checking neighboring blocks in the first group in a first specific order to be that a reference picture thereof is the same as a reference picture of the current block. In other words, the candidate motion vector for CP1 may be the motion vector of the block whose reference picture first confirmed by checking neighboring blocks within the first group according to a first order is the same as the reference picture of the current block. The availability may indicate that the neighboring block exists, and the neighboring block is coded by inter prediction. Here, if the reference picture of the first block within the first group is the same as the reference picture of the current block, the candidate motion vector for CP0 may be available. Also, for example, the first group may include neighboring block A, neighboring block B, and neighboring block C; and the first specific order may be an order from the neighboring block A to the neighboring block B, and then to the neighboring block C.

Also, the second block may be a block which has been first confirmed while checking neighboring blocks in the second group in a second specific order to be that a reference picture thereof is the same as a reference picture of the current block. Here, if the reference picture of the second block within the second group is the same as the reference picture of the current block, the candidate motion vector for CP1 may be available. Also, for example, the second group may include neighboring block D and neighboring block E, and the second specific order may be an order from the neighboring block D to the neighboring block E.

Meanwhile, when a size of the current block is W×H, x component of the top-left sample position of the current block is 0, and y component thereof is 0, neighboring block A may be the block including a sample at the coordinates of (−1, −1), neighboring block B may be the block including a sample at the coordinates of (0, −1), neighboring block C may be the block including a sample at the coordinates of (−1, 0), neighboring block D may be the block including a sample at the coordinates of (W−1, −1), and neighboring block E may be the block including a sample at the coordinates of (W, −1). In other words, neighboring block A may be the top-left corner neighboring block of the current block, neighboring block B the top neighboring block at the most left position among top neighboring blocks of the current block, neighboring block C the left neighboring block at the highest position among left neighboring blocks of the current block, neighboring block D the top neighboring block at the most right position among top neighboring blocks of the current block, and neighboring block E the top-right corner neighboring block of the current block.

Meanwhile, if at least one of the candidate motion vector of CP0 and the candidate motion vector of CP1 is not available, the constructed affine MVP candidate may not be available.

Or, for example, if six-parameter affine motion model is applied to the current block, the CPs of the current block may include CP0, CP1, and CP2. If the candidate motion vector for the CP0 is available, the candidate motion vector for the CP1 is available, and the candidate motion vector for the CP2 is available, the constructed affine MVP candidate may be available, and the affine MVP candidate list may include the constructed affine MVP candidate. Here, the CP0 may represent the top-left position of the current block, the CP1 may represent the top-right position of the current block, and the CP2 may represent the bottom-left position of the current block.

The constructed affine MVP candidate may include the candidate motion vector for CP0, the candidate motion vector for CP1, and the candidate motion vector for CP2. The candidate motion vector for CP0 may be the motion vector of a first block, the candidate motion vector for CP1 may be the motion vector of a second block, and the candidate motion vector for CP2 may be the motion vector of a third block.

Also, the first block may be a block which has been first confirmed while checking neighboring blocks in the first group in a first specific order to be that a reference picture thereof is the same as a reference picture of the current block. Here, if the reference picture of the first block within the first group is the same as the reference picture of the current block, the candidate motion vector for CP0 may be available. Also, for example, the first group may include neighboring block A, neighboring block B, and neighboring block C, and the first specific order may be an order from the neighboring block A to the neighboring block B, and then to the neighboring block C.

Also, the second block may be a block which has been first confirmed while checking neighboring blocks in the second group in a second specific order to be that a reference picture thereof is the same as a reference picture of the current block. Here, if the reference picture of the second block within the second group is the same as the reference picture of the current block, the candidate motion vector for CP1 may be available. Also, for example, the second group may include neighboring block D and neighboring block E, and the second specific order may be an order from the neighboring block D to the neighboring block E.

Also, the third block may be a block which has been first confirmed while checking neighboring blocks in the third group in a third specific order to be that a reference picture thereof is the same as a reference picture of the current block. Here, if the reference picture of the third block within the third group is the same as the reference picture of the current block, the candidate motion vector for CP2 may be available. Also, for example, the third group may include neighboring block F and neighboring block G, and the third specific order may be an order from the neighboring block F to the neighboring block G.

Meanwhile, when a size of the current block is W×H, x component of the top-left sample position of the current block is 0, and y component thereof is 0, neighboring block A may be the block including a sample at the coordinates of (−1, −1), neighboring block B may be the block including a sample at the coordinates of (0, −1), neighboring block C may be the block including a sample at the coordinates of (−1, 0), neighboring block D may be the block including a sample at the coordinates of (W−1, −1), neighboring block E may be the block including a sample at the coordinates of (W, −1), and neighboring block F may be the block including a sample at the coordinates of (−1, H−1), and neighboring block G may be the block including a sample at the coordinates of (−1, H). In other words, neighboring block A may be the top-left corner neighboring block of the current block, neighboring block B the top neighboring block at the most left position among top neighboring blocks of the current block, neighboring block C the left neighboring block at the highest position among left neighboring blocks of the current block, neighboring block D the top neighboring block at the most right position among top neighboring blocks of the current block, neighboring block E the top-right corner neighboring block of the current block, neighboring block F the left neighboring block at the lowest position among left neighboring blocks of the current block, and neighboring block G the bottom-left corner neighboring block of the current block.

Meanwhile, if at least one of the candidate motion vector of CP0, the candidate motion vector of CP1, and the candidate motion vector of CP2 is not available, the constructed affine MVP candidate may not be available.

Meanwhile, a pruning check process may not be performed between the inherited affine MVP candidate and the constructed affine MVP candidate. The pruning check process may represent a process that checks whether the constructed affine MVP candidate is the same as the inherited affine MVP candidate but does not derive the constructed affine MVP candidate if they are found to be identical.

Afterwards, the affine MVP candidate list may be derived based on the steps described below.

For example, when the number of derived affine MVP candidates is less than 2, and the motion vector for CP0 is available, the decoding apparatus may derive a first affine MVP candidate. Here, the first affine MVP candidate may be the affine MVP candidate including the motion vector for CP0 as the candidate motion vectors for the CPs.

Also, for example, when the number of derived affine MVP candidates is less than 2, and the motion vector for CP1 is available, the decoding apparatus may derive a second affine MVP candidate. Here, the second affine MVP candidate may be the affine MVP candidate including the motion vector for CP1 as the candidate motion vectors for the CPs.

Also, for example, when the number of derived affine MVP candidates is less than 2, and the motion vector for CP2 is available, the decoding apparatus may derive a third affine MVP candidate. Here, the third affine MVP candidate may be the affine MVP candidate including the motion vector for CP2 as the candidate motion vectors for the CPs.

Also, for example, when the number of derived affine MVP candidates is less than 2, the decoding apparatus may derive a fourth affine MVP candidate including a temporal MVP derived based on a temporal neighboring block of the current block as the candidate motion vectors for the CPs. The temporal neighboring block may refer to the same collocated block within the same collocated picture corresponding to the current block. The temporal MVP may be derived based on the motion vector of the temporal neighboring block.

Also, for example, when the number of derived affine MVP candidates is less than 2, the decoding apparatus may derive a fifth affine MVP candidate including a zero motion vector as the candidate motion vectors for the CPs. The zero motion vector may represent a motion vector whose elements are all zeros.

The decoding apparatus derives Control Point Motion Vector Predictors (CPMVPs) for Control Points (CPs) of the current block based on the affine MVP candidate list S2320.

The decoding apparatus may select a specific affine MVP candidate among the affine MVP candidates included in the affine MVP candidate list and derive the selected affine MVP candidate as CPMVPs for the CPs of the current block. For example, the decoding apparatus may obtain the affine MVP candidate index for the current block from a bitstream and among the affine MVP candidates included in the affine MVP candidate list, derive the affine MVP candidate indicated by the affine MVP candidate index as the CPMVPs for the CPs of the current block. More specifically, if an affine MVP candidate includes a candidate motion vector for CP0 and a candidate motion vector for CP1, the candidate motion vector for CP0 of the affine MVP candidate may be derived as CPMVP of the CP0, and the candidate motion vector for CP1 of the affine MVP candidate may be derived as CPMVP of the CP1. Also, if an affine MVP candidate includes a candidate motion vector for CP0, a candidate motion vector for CP1, and a candidate motion vector for CP2, the candidate motion vector for CP0 of the affine MVP candidate may be derived as CPMVP of the CP0, the candidate motion vector for CP1 of the affine MVP candidate may be derived as CPMVP of the CP1, and the candidate motion vector for CP2 of the affine MVP candidate may be derived as CPMVP of the CP2. Also, if an affine MVP candidate includes a candidate motion vector for CP0 and a candidate motion vector for CP2, the candidate motion vector for CP0 of the affine MVP candidate may be derived as CPMVP of the CP0, and the candidate motion vector for CP2 of the affine MVP candidate may be derived as CPMVP of the CP2.

The decoding apparatus derives Control Point Motion Vector Differences (CPMVDs) for the CPs of the current block based on the motion prediction information S2330. The motion prediction information may include information on the CPMVD for each CP, and the decoding apparatus may derive the CPMVD for each of the CPs of the current block based on the information on the CPMVD for each of the CPs.

The decoding apparatus derives Control Point Motion Vectors (CPMVs) for the CPs of the current block based on the CPMVPs and the CPMVDs S2340. The decoding apparatus may derive CPMV for each of the CPs based on the CPMVP and CPMVD for each of the CPs. For example, the decoding apparatus may derive the CPMV for each CP by adding the CPMVP and CPMVD for the CP.

The decoding apparatus derives prediction samples for the current block based on the CPMVs S2350. The decoding apparatus may derive motion vectors of the current block in sub-block or sample units based on the CPMVs. In other words, the decoding apparatus may derive a motion vector of each sub-block or each sample of the current block based on the CPMVs. The motion vectors in the sub-block or sample units may be derived by Eq. 1 or Eq. 3 above. The motion vectors may be referred to as affine Motion Vector Field (MVF) or motion vector array.

The decoding apparatus may derive prediction samples for the current block based on motion vectors in the sub-block or sample units. The decoding apparatus may derive a reference region within a reference picture based on the motion vector in sub-block or sample units and generate prediction samples of the current block based on the reconstructed samples within the reference region.

The decoding apparatus generates a reconstructed picture for the current block based on the derived prediction samples S2360. The decoding apparatus may generate the reconstructed picture for the current block based on the derived prediction samples. According to prediction mode, the decoding apparatus may directly use the prediction samples as reconstructed samples or generate reconstructed samples by adding residual samples to the prediction samples. In the presence of residual samples for the current block, the decoding apparatus may obtain information on the residuals for the current block from the bitstream. The information on the residuals may include transform coefficients for the residual samples. The decoding apparatus may derive the residual samples (or residual sample array) for the current block based on the residual information. The decoding apparatus may generate reconstructed samples based on the prediction samples and the residual samples and derive a reconstructed block or a reconstructed picture based on the reconstructed samples. Afterwards, the decoding apparatus may apply the in-loop filtering process such as deblocking filtering and/or SAO process to the reconstructed picture to improve subjective/objective image quality depending on the needs, as described above.

Figure 24:
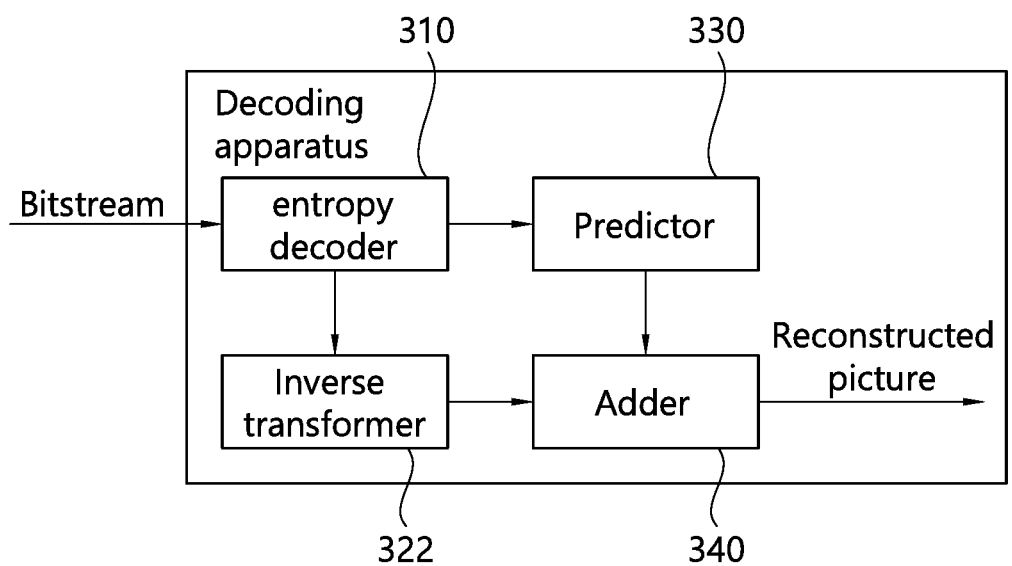
FIG. 24 illustrates a decoding apparatus performing a video decoding method according to the present disclosure.

FIG. 24 illustrates a decoding apparatus performing a video decoding method according to the present disclosure. The method disclosed in FIG. 23 may be performed by the decoding apparatus disclosed in FIG. 24. More specifically, for example, the entropy decoder of the decoding apparatus of FIG. 24 may perform S2300 step of FIG. 23, the predictor of the decoding apparatus of FIG. 24 may perform S2310 to S2350 steps, and the adder of the decoding apparatus of FIG. 24 may perform S2360 step of FIG. 23. Also, although not shown in the figure, the process for obtaining image information including information on the residuals of a current block through a bitstream may be performed by the entropy decoder of the decoding apparatus of FIG. 24, and the process for deriving the residual samples for the current block based on the residual information may be performed by the inverse transformer of the decoding apparatus of FIG. 24.

According to the present disclosure, efficiency of video coding based on affine motion prediction may be improved.

Also, according to the present disclosure, in deriving the affine MVP candidate list, only when all the candidate motion vectors for CPs of constructed affine MVP candidates are available, the constructed affine MVP candidates may be added, through which complexity of the process for deriving constructed affine MVP candidates and the process for constructing an affine MVP candidate list may be reduced, and coding efficiency may be improved.

Also, according to the present disclosure, in deriving the affine MVP candidate list, additional affine MVP candidates may be derived based on candidate motion vectors for CPs derived through the process for deriving constructed affine MVP candidates, through which complexity of the process for constructing an affine MVP candidate list may be reduced, and coding efficiency may be improved.

Also, according to the present disclosure, in deriving inherited affine MVP candidates, only when a top neighboring block is included in a current CTU, the inherited affine MVP candidate may be derived by using the top neighboring block, through which the amount of storage of a line buffer for affine prediction may be reduced, and hardware cost may be minimized.

In the embodiment above, although the methods have been described based on the flow diagrams by using a series of steps or blocks, the present disclosure is not limited to the specific sequence of the steps, and some steps may be performed at different sequences from the remaining steps or may be performed simultaneously with the remaining steps. Furthermore, it should be understood by those skilled in the art that the steps shown in the flow diagrams are not exclusive, other steps may be further included, or one or more steps of the flow diagrams may be deleted without affecting the technical scope of the present disclosure.

The embodiments according to the present disclosure may be implemented and performed on a processor, a microprocessor, a controller, or a chip. For example, function units illustrated in each drawing may be implemented and performed on a computer, a processor, a micro-processor, a controller, or a chip. In this case, information (for example, information on instructions) or algorithm for implementation may be stored in a digital storage medium.

Also, the decoding apparatus and the encoding apparatus to which embodiments of the present disclosure are applied may include a multimedia broadcast transmission and reception device, a mobile communication terminal, a home cinema video device, a digital cinema video device, a surveillance camera, a video communication device, a real-time communication device for video communication, mobile streaming device, a storage medium, a camcorder, a video on demand (VoD) service provision device, an Over the top (OTT) video device, Internet streaming service provision device, a 3D video device, a video phone device, a transportation means terminal (for example, vehicle terminal, airplane terminal, and ship terminal), and a medical video device; and may be used for processing a video signal or a data signal. For example, OTT video devices may include a game console, a Bluray player, an Internet connection TV, a home theater system, a smartphone, a tablet PC, and a digital video recorder (DVR).

Also, a processing method to which embodiments of the present disclosure are applied may be produced in the form of a program executed by a computer and may be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Bluray disk (BD), universal serial bus (USB), ROM, PROM, EPROM, EEPROM, RAM, CD-ROM, a magnetic tape, a floppy disk, and an optical data storage device. Also, the computer-readable recording medium includes a media implemented in the form of a carrier (for example, transmission through the Internet). Also, a bitstream generated according to the encoding method may be stored in a computer-readable recording medium or transmitted through a wired or a wireless communication network.

Also, the embodiment of the present disclosure may be implemented as a computer program product in the form of program code, and the program code may be executed by a computer according to the embodiment of the present disclosure. The program code may be stored on a computer-readable carrier.

Figure 25:
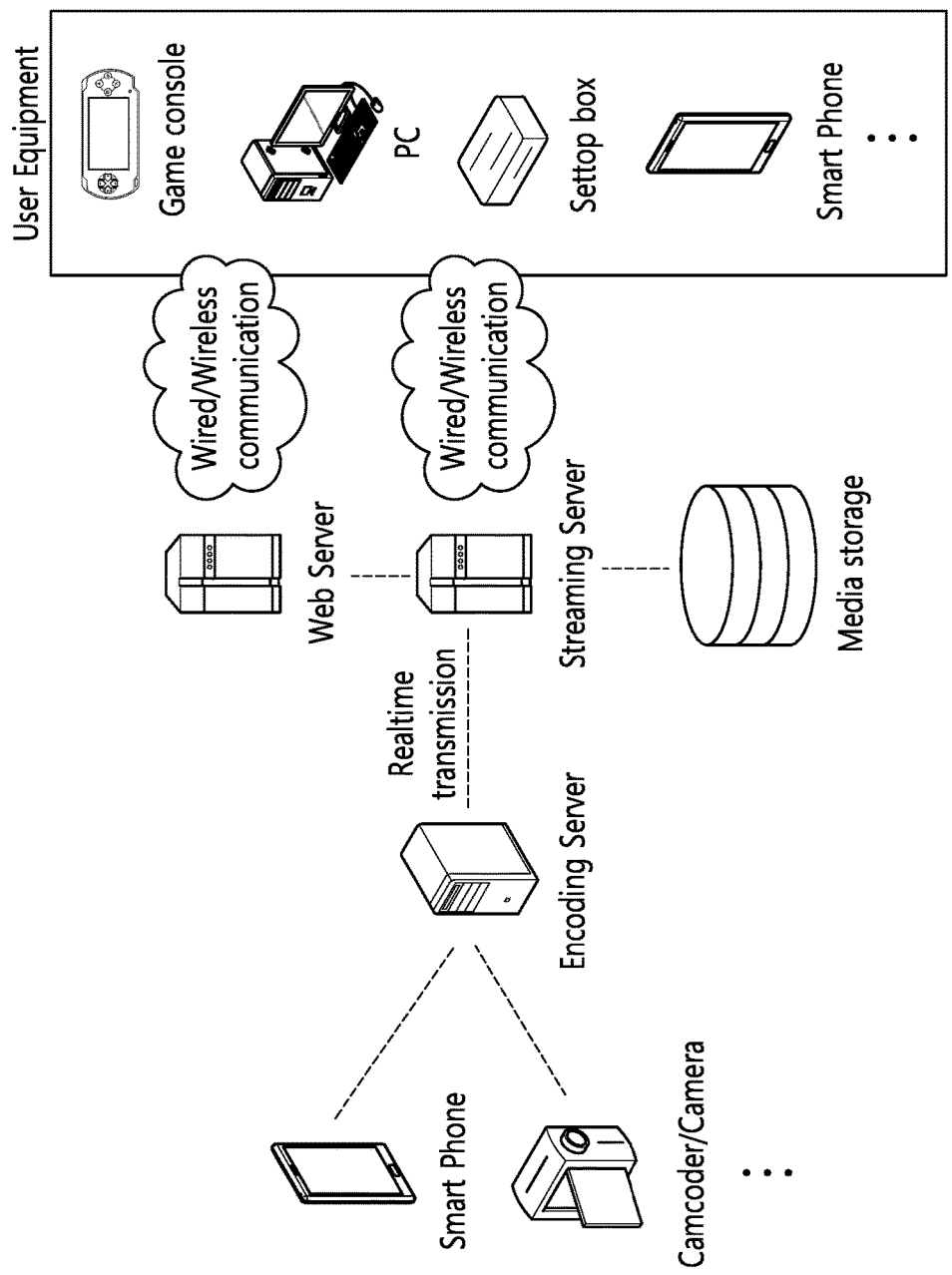
FIG. 25 illustrates a content streaming system structure to which embodiments of the present disclosure are applied.

FIG. 25 illustrates a content streaming system structure to which embodiments of the present disclosure are applied.

The content streaming system to which embodiments of the present disclosure are applied may largely include an encoding server, a streaming server, a web server, a media storage, a user device, and a multimedia input device.

The encoding server compresses contents input from multimedia input devices such as a smartphone, a camera, or a camcorder into digital data to generate a bitstream and transmit the bitstream to the streaming server. As another example, if multimedia input devices such as a smartphone, a camera, or a camcorder directly generate a bitstream, the encoding server may be omitted.

The bitstream may be generated by an encoding method or a method for generating a bitstream to which the embodiments of the present disclosure are applied, and the streaming server may temporarily store the bitstream while the bitstream is transmitted or received.

The streaming server transmits multimedia data to a user device based on a user request through a web server, and the web server serves performs the role of informing the user of which services are available. If the user requests a desired service from the web server, the web server transmits the request to the streaming server, and the streaming server transmits multimedia data to the user. In this case, the content streaming system may include a separate control server. In this case, the control server serves to control commands/responses between devices within the content streaming system.

The streaming server may receive contents from a media storage and/or encoding server. For example, when the contents are received from the encoding server, the contents may be received in real time. In this case, in order to provide a smooth streaming service, the streaming server may store the bitstream for a predetermined time period.

Examples of the user device may include a mobile phone, a smartphone, a laptop computer, a digital broadcasting terminal, a personal digital assistant (PDA), a portable multimedia player (PMP), a navigation terminal, a slate PC, a tablet PC, a ultrabook, a wearable device (for example, a smartwatch, smart glasses, and a head mounted display (HMD)), a digital TV, a desktops computer, and digital signage. Each individual server within the content streaming system may be operated as a distributed server, in which case data received from each server may be processed in a distributed manner.

What is claimed is:

1. A video decoding method performed by a decoding apparatus, comprising:
    obtaining motion prediction information for a current block from a bitstream;
    constructing an affine Motion Vector Predictor (MVP) candidate list for the current block;
    deriving Control Point Motion Vector Predictors (CPMVPs) for Control Points (CPs) of the current block based on the affine MVP candidate list;
    deriving Control Point Motion Vector Differences (CPMVDs) for the CPs of the current block based on the motion prediction information;
    deriving Control Point Motion Vectors (CPMVs) for the CPs of the current block based on the CPMVPs and the CPMVDs; and
    generating a reconstructed picture for the current block by performing inter prediction on the current block based on the CPMVs,
    wherein the constructing the affine MVP candidate list comprises:
    checking whether an inherited affine MVP candidate is available, wherein the inherited affine MVP candidate is derived when the inherited affine MVP candidate is available;
    checking whether a constructed affine MVP candidate is available, wherein the constructed affine MVP candidate is derived when the constructed affine MVP candidate is available, and the constructed affine MVP candidate includes a candidate motion vector for CP0 of the current block, a candidate motion vector for CP1 of the current block, and a candidate motion vector for CP2 of the current block;
    when the number of derived affine MVP candidates including the inherited affine MVP candidate and the constructed affine MVP candidate is less than 2, deriving a first affine MVP candidate, wherein the first affine MVP candidate is an affine MVP candidate including a specific motion vector as candidate motion vectors for the CPs and the specific motion vector is an available motion vector among the candidate motion vector for the CP0, the candidate motion vector for the CP1, and the candidate motion vector for the CP2.

2. The method of claim 1, wherein the CP0 represents a top-left position of the current block, the CP1 represents a top-right position of the current block, and the CP2 represents a bottom-left position of the current block; and
    the constructed affine MVP candidate is available when the candidate motion vectors are available.

3. The method of claim 2, wherein, when a reference picture of a first block in a first group is the same as a reference picture of the current block, the candidate motion vector for the CP0 is available,
    when a reference picture of a second block in a second group is the same as the reference picture of the current block, the candidate motion vector for the CP1 is available,
    when a reference picture of a third block in a third group is the same as the reference picture of the current block, the candidate motion vector for the CP2 is available; and
    when the candidate motion vector for the CP0 is available, the candidate motion vector for the CP1 is available, and the candidate motion vector for the CP2 is available, the affine MVP candidate list includes the constructed affine MVP candidate.

4. The method of claim 3, wherein the first group includes a neighboring block A, a neighboring block B, and a neighboring block C; the second group includes a neighboring block D and a neighboring block E; and the third group includes a neighboring block F and a neighboring block G; and
    when a size of the current block is W×H, and an x component and a y component of a top-left sample position of the current block are 0, the neighboring block A is a block including a sample at coordinates of (−1, −1), the neighboring block B is a block including a sample at coordinates of (0, −1), the neighboring block C is a block including a sample at coordinates of (−1, 0), the neighboring block D is a block including a sample at coordinates of (W−1, −1), the neighboring block E is a block including a sample at coordinates of (W, −1), the neighboring block F is a block including a sample at coordinates of (−1, H−1), and the neighboring block G is a block including a sample at coordinates of (−1, H).

5. The method of claim 4, wherein the first block is a block which has been first confirmed while checking neighboring blocks in the first group in a first specific order to be that a reference picture is same as a reference picture of the current block,
    the second block is a block which has been first confirmed while checking neighboring blocks in the second group in a second specific order to be that a reference picture is same as a reference picture of the current block, and
    the third block is a block which has been first confirmed while checking neighboring blocks in the third group in a third specific order to be that a reference picture is same as a reference picture of the current block.

6. The method of claim 5, wherein the first specific order is an order from the neighboring block A to the neighboring block B, and then to the neighboring block C,
the second specific order is an order from the neighboring block D to the neighboring block E, and
the third specific order is an order from the neighboring block F to the neighboring block G.

7. The method of claim 1, wherein availability of neighboring blocks of the current block is checked in a specific order, and the inherited affine MVP candidates are derived based on an available neighboring block checked.

8. The method of claim 7, wherein the available neighboring block is a neighboring block coded according to affine motion model and whose reference picture is the same as the reference picture of the current block.

9. The method of claim 8, wherein the neighboring blocks include a left neighboring block and a top neighboring block of the current block.

10. The method of claim 8, wherein the neighboring blocks include the left neighboring block of the current block, and
when the top neighboring block of the current block is included in a current Coding Tree Unit (CTU) including the current block, the neighboring blocks include the top neighboring block of the current block.

11. The method of claim 9, wherein when the neighboring blocks include the left neighboring block and the top neighboring block, the specific order is an order from the left neighboring block to the top neighboring block.

12. The method of claim 11, wherein, when a size of the current block is W×H, and an x component and a y component of a top-left sample position of the current block is 0, the left neighboring block is a block including a sample at the coordinates of (−1, H−1), and the top neighboring block is a block including a sample at the coordinates of (W−1, −1).

13. The method of claim 1, wherein pruning check between the inherited affine MVP candidate and the constructed affine MVP candidate is not performed.

14. The method of claim 1, wherein, when a top neighboring block of the current block is included in a current Coding Tree Unit (CTU) including the current block, the top neighboring block is used for deriving the inherited affine MVP candidate, and
when the top neighboring block of the current block is not included in the current CTU, the top neighboring block is not used for deriving the inherited affine MVP candidate.

15. A video encoding method performed by an encoding apparatus, comprising:
constructing an affine Motion Vector Predictor (MVP) candidate list for a current block;
deriving Control Point Motion Vector Predictors (CPMVPs) for Control Points (CPs) of the current block based on the affine MVP candidate list;
deriving CPMVs for the CPs of the current block;
generating a reconstructed picture for the current block by performing inter prediction on the current block based on the CPMVs;
deriving Control Point Motion Vector Differences (CPMVDs) for the CPs of the current block based on the CPMVPs and the CPMVs; and
encoding motion prediction information including information on the CPMVDs,
wherein the constructing the affine MVP candidate list comprises:
checking whether an inherited affine MVP candidate of the current block is available, wherein the inherited affine MVP candidate is derived when the inherited affine MVP candidate is available;
checking whether a constructed affine MVP candidate is available, wherein the constructed affine MVP candidate is derived when the constructed affine MVP candidate is available, and the constructed affine MVP candidate includes a candidate motion vector for CP0 of the current block, a candidate motion vector for CP1 of the current block, and a candidate motion vector for CP2 of the current block;
when the number of derived affine MVP candidates including the inherited affine MVP candidate and the constructed affine MVP candidate is less than 2, deriving a first affine MVP candidate, wherein the first affine MVP candidate is an affine MVP candidate including a specific motion vector as candidate motion vectors for the CPs and the specific motion vector is an available motion vector among the candidate motion vector for the CP0, the candidate motion vector for the CP1, and the candidate motion vector for the CP2.

16. A non-transitory computer-readable storage medium storing a bitstream generated by a method, the method comprising:
constructing an affine Motion Vector Predictor (MVP) candidate list for a current block;
deriving Control Point Motion Vector Predictors (CPMVPs) for Control Points (CPs) of the current block based on the affine MVP candidate list;
deriving CPMVs for the CPs of the current block;
generating a reconstructed picture for the current block by performing inter prediction on the current block based on the CPMVs;
deriving Control Point Motion Vector Differences (CPMVDs) for the CPs of the current block based on the CPMVPs and the CPMVs;
encoding motion prediction information including information on the CPMVDs; and
generating the bitstream including the motion prediction information,
wherein the constructing the affine MVP candidate list comprises:
checking whether an inherited affine MVP candidate of the current block is available, wherein the inherited affine MVP candidate is derived when the inherited affine MVP candidate is available;
checking whether a constructed affine MVP candidate is available, wherein the constructed affine MVP candidate is derived when the constructed affine MVP candidate is available, and the constructed affine MVP candidate includes a candidate motion vector for CP0 of the current block, a candidate motion vector for CP1 of the current block, and a candidate motion vector for CP2 of the current block;
when the number of derived affine MVP candidates including the inherited affine MVP candidate and the constructed affine MVP candidate is less than 2, deriving a first affine MVP candidate, wherein the first affine MVP candidate is an affine MVP candidate including a specific motion vector as candidate motion vectors for the CPs and the specific motion vector is an available motion vector among the candidate motion vector for the CP0, the candidate motion vector for the CP1, and the candidate motion vector for the CP2.

17. A transmission method of data for image, the method comprising:
- obtaining a bitstream of motion prediction information including information on Control Point Motion Vector Differences (CPMVDs) for Control Points (CPs) of a current block; and
- transmitting the data including the bitstream of the motion prediction information,
- wherein the CPMVDs are derived based on control point motion vectors (CPMVs) for the CPs and control point motion vector predictors (CPMVPs) for the CPs of the current block derived based on an affine Motion Vector Predictor (MVP) candidate list for the current block,
- wherein constructing the affine MVP candidate list comprises:
- checking whether an inherited affine MVP candidate of the current block is available, wherein the inherited affine MVP candidate is derived when the inherited affine MVP candidate is available;
- checking whether a constructed affine MVP candidate of the current block is available, wherein the constructed affine MVP candidate is derived when the constructed affine MVP candidate is available, and the constructed affine MVP candidate includes a candidate motion vector for CP0 of the current block, a candidate motion vector for CP1 of the current block, and a candidate motion vector for CP2 of the current block;
- when the number of derived affine MVP candidates including the inherited affine MVP candidate and the constructed affine MVP candidate is less than 2, deriving a first affine MVP candidate, wherein the first affine MVP candidate is an affine MVP candidate including a specific motion vector as candidate motion vectors for the CPs and the specific motion vector is an available motion vector among the candidate motion vector for the CP0, the candidate motion vector for the CP1, and the candidate motion vector for the CP2,
- wherein the CP0 represents a top-left position of the current block, the CP1 represents a top-right position of the current block, and the CP2 represents a bottom-left position of the current block.

* * * * *